United States Patent
Beard et al.

(10) Patent No.: US 10,789,263 B2
(45) Date of Patent: *Sep. 29, 2020

(54) SYSTEM AND USER INTERFACES FOR SEARCHING RESOURCES AND RELATED DOCUMENTS USING DATA STRUCTURES

(71) Applicant: Palantir Technologies Inc., Palo Alto, CA (US)

(72) Inventors: Mitchell Beard, Falls Church, VA (US); Juan Ricafort, New York, NY (US); Kevin Verdieck, Palo Alto, CA (US); Divya Mahalingam, Palo Alto, CA (US); Jack Grossman, Palo Alto, CA (US)

(73) Assignee: Palantir Technologies Inc., Palo Alto, CA (US)

( * ) Notice: Subject to any disclaimer, the term of this patent is extended or adjusted under 35 U.S.C. 154(b) by 216 days.

This patent is subject to a terminal disclaimer.

(21) Appl. No.: 15/707,895

(22) Filed: Sep. 18, 2017

(65) Prior Publication Data

US 2018/0004825 A1    Jan. 4, 2018

Related U.S. Application Data

(63) Continuation of application No. 15/208,378, filed on Jul. 12, 2016, now Pat. No. 9,798,787.

(Continued)

(51) Int. Cl.
*G06F 16/248* (2019.01)
*G06F 16/25* (2019.01)
(Continued)

(52) U.S. Cl.
CPC ........ *G06F 16/248* (2019.01); *G06F 16/2428* (2019.01); *G06F 16/2455* (2019.01);
(Continued)

(58) Field of Classification Search
CPC ........ G06F 17/30572; G06F 17/30867; G06F 17/30011; G06F 17/30554; G06F 17/30696; G06F 17/30994
See application file for complete search history.

(56) References Cited

U.S. PATENT DOCUMENTS 5,568,390 A    10/1996    Hirota et al.
5,819,232 A    10/1998    Shipman
(Continued)

FOREIGN PATENT DOCUMENTS

EP    0652513    5/1995
EP    1926074    5/2008
(Continued)

OTHER PUBLICATIONS

Ashraf, "Protect your Google Account (Gmail) by enabling SMS (text message) notifications for Suspicious Activity," online article from dotTech, Jan. 24, 2013, https://dottech.org/94405/how-to-setup-text-message-sms-google-notifications-for-suspicious-activity/.
(Continued)

*Primary Examiner* — Yuk Ting Choi
(74) *Attorney, Agent, or Firm* — Knobbe Martens Olson & Bear LLP

(57) ABSTRACT

Various systems and methods are provided for accessing and traversing one or more data structures and generating a functional user interface that can enable non-technical users to quickly and dynamically search for resources of an organization and/or associated documents, events, entities, and/or other data. The user interfaces are interactive such that a user may make selections, provide inputs, and/or manipulate outputs. In response to various user inputs, the system automatically accesses and traverses data structures relating to resources, documents, events, entities, and other data, identifies resources, documents, events, entities, and/or other data that meet search criteria, and returns search results (Continued)

including resources that meet the search criteria and/or resources that are associated with documents, events, entities, and/or other data that meet the search criteria. Resources, documents, events, entities, and other data can be represented by respective types of data structures, which may be associated with other types of data structures. Properties or fields of data structures can have security settings and permissions associated with them.

10 Claims, 23 Drawing Sheets

Related U.S. Application Data

(60) Provisional application No. 62/265,919, filed on Dec. 10, 2015.

(51) Int. Cl.
*G06F 16/93* (2019.01)
*G06F 16/242* (2019.01)
*G06F 16/2455* (2019.01)
*G06F 16/9535* (2019.01)

(52) U.S. Cl.
CPC .............. *G06F 16/25* (2019.01); *G06F 16/93* (2019.01); *G06F 16/9535* (2019.01)

(56) References Cited

U.S. PATENT DOCUMENTS

| | | | |
|---|---|---|---|
| 5,857,329 | A | 1/1999 | Bingham |
| 5,902,349 | A | 5/1999 | Endo et al. |
| 6,226,561 | B1 | 5/2001 | Tamaki et al. |
| 6,496,774 | B1 | 12/2002 | Davies |
| 6,608,559 | B1 | 8/2003 | Lemelson et al. |
| 7,603,229 | B2 | 10/2009 | Goldberg et al. |
| 7,603,367 | B1* | 10/2009 | Kanter ............... G06F 16/00 707/999.003 |
| 7,818,291 | B2 | 10/2010 | Ferguson et al. |
| 7,941,321 | B2 | 5/2011 | Greenstein et al. |
| 8,042,110 | B1 | 10/2011 | Kawahara et al. |
| 8,046,283 | B2 | 10/2011 | Burns |
| 8,108,138 | B2 | 1/2012 | Bruce et al. |
| 8,352,174 | B2 | 1/2013 | Milstein et al. |
| 8,417,409 | B2 | 4/2013 | Bast et al. |
| 8,763,078 | B1 | 6/2014 | Castellucci et al. |
| 8,786,605 | B1 | 7/2014 | Curtis et al. |
| 9,092,482 | B2 | 7/2015 | Harris et al. |
| 9,280,532 | B2 | 3/2016 | Cicerone |
| 9,798,787 | B1 | 10/2017 | Beard et al. |
| 2003/0212670 | A1 | 11/2003 | Yalamanchi et al. |
| 2004/0153418 | A1 | 8/2004 | Hanweck |
| 2004/0254658 | A1 | 12/2004 | Sherriff et al. |
| 2006/0241856 | A1 | 10/2006 | Cobleigh et al. |
| 2007/0088596 | A1 | 4/2007 | Berkelhamer et al. |
| 2007/0198571 | A1 | 8/2007 | Ferguson et al. |
| 2007/0220604 | A1 | 9/2007 | Long |
| 2008/0301559 | A1 | 12/2008 | Martinsen et al. |
| 2008/0313281 | A1 | 12/2008 | Scheidl et al. |
| 2009/0037224 | A1 | 2/2009 | Raduchel |
| 2009/0037912 | A1 | 2/2009 | Stoitsev et al. |
| 2009/0172674 | A1 | 7/2009 | Bobak et al. |
| 2009/0204461 | A1 | 8/2009 | Jain et al. |
| 2009/0319418 | A1 | 12/2009 | Herz |
| 2010/0004857 | A1 | 1/2010 | Pereira et al. |
| 2010/0070897 | A1 | 3/2010 | Aymeloglu et al. |
| 2010/0162371 | A1 | 6/2010 | Geil |
| 2010/0205662 | A1 | 8/2010 | Ibrahim et al. |
| 2011/0041084 | A1 | 2/2011 | Karam |
| 2011/0153592 | A1 | 6/2011 | DeMarcken |
| 2011/0185401 | A1 | 7/2011 | Bak et al. |
| 2011/0295863 | A1* | 12/2011 | Weir ................. G06F 16/90328 707/754 |
| 2012/0101952 | A1 | 4/2012 | Raleigh et al. |
| 2012/0290506 | A1 | 11/2012 | Muramatsu et al. |
| 2013/0036346 | A1 | 2/2013 | Cicerone |
| 2013/0212275 | A1 | 8/2013 | Viswanathan et al. |
| 2013/0231862 | A1 | 9/2013 | Delling et al. |
| 2013/0262528 | A1 | 10/2013 | Foit |
| 2013/0286601 | A1 | 10/2013 | Shin et al. |
| 2013/0288719 | A1 | 10/2013 | Alonzo |
| 2014/0025691 | A1 | 1/2014 | Jain et al. |
| 2014/0081685 | A1 | 3/2014 | Thacker et al. |
| 2014/0115610 | A1 | 4/2014 | Marinelli, III et al. |
| 2014/0181833 | A1 | 6/2014 | Bird et al. |
| 2015/0120176 | A1 | 4/2015 | Curtis et al. |
| 2015/0261758 | A1* | 9/2015 | Sharp ...................... G06F 16/14 707/732 |
| 2015/0261817 | A1 | 9/2015 | Harris et al. |
| 2016/0117403 | A1* | 4/2016 | Isaacs ................. G06F 16/9535 707/722 |
| 2016/0147730 | A1 | 5/2016 | Cicerone |

FOREIGN PATENT DOCUMENTS

| | | |
|---|---|---|
| EP | 2555126 | 2/2013 |
| EP | 2876587 | 5/2015 |
| WO | WO 2012/025915 | 3/2012 |

OTHER PUBLICATIONS

Ballesteros et al., "Batching: A Design Pattern for Efficient and Flexible Client/Server Interaction," Transactions on Pattern Languages of Programming, Springer Berlin Heildeberg, 2009, pp. 48-66.

Bogle et al., "Reducing Cross-Domain Call Overhead Using Batched Futures," SIGPLAN No. 29, (Oct. 10, 1994) pp. 341-54.

Chen et al., "A Novel Emergency Vehicle Dispatching System," 2013 IEEE 77th Vehicular Technology Conference, IEEE, Jun. 2, 2013, 5 pages.

Eklund et al., "A Dynamic Multi-source Dijkstra's Algorithm for Vehicle Routing," Intelligent Information Systems, 1996, pp. 329-333.

Hart et al., "A Formal Basis for the Heuristic Determination of Minimum Cost Paths," IEEE Transactions on Systems Science and Cybernetics, IEEE, vol. 1, No. 2, Jul. 1, 1968, pp. 100-107.

IBM, "Determining Business Object Structure," IBM, 2004, 9 pages.

Jotshi et al., "Dispatching and Routing of Emergency Vehicles in Disaster Mitigation Using Data Fusion." Socio-Economic Planning Sciences, Pergamon, Amsterdam, Netherlands, vol. 43, No. 1, Mar. 1, 2009, 24 pages.

Mohring et al., "Partitioning Graphs to Speedup Dijkstra's Algorithm," ACM Journal of Experimental Algorithmics, Association of Computing Machinery, New York, New York, vol. 11, Jan. 1, 2006, 29 pages.

Reedy, Sarah, "Policy and Charging Rules Function (PCRF)," Sep. 13, 2010, http://www.lightreading.com/document.asp?doc_id=680015 printed Dec. 10, 2013 in 4 pages.

Stamos et al., "Remote Evaluation," Journal ACM Transactions on Programming Languages and Systems (TOPLAS), vol. 12, Issue 4, Oct. 1990, pp. 537-564.

Vose et al., "Help File for ModelRisk Version 5," 2007, Vose Software, pp. 349-353. [Uploaded in 2 Parts].

Wagner et al., "Dynamic Shortest Paths Containers," Electronic Notes in Theoretical Computer Science, vol. 92, No. 1, 2003, pp. 1-19.

Wikipedia, "Machine Code", p. 1-5, printed Aug. 11, 2014.

Yang et al., "An Enhanced Routing Method with Dijkstra Algorithm and AHP Analysis in GIS-based Emergency Plan," Geoinformatics, 2010 18th International Conference on, IEEE, Piscataway, New Jersey, Jun. 18, 2010, 6 pages.

Notice of Allowance for U.S. Appl. No. 13/196,788 dated Dec. 18, 2015.

Notice of Allowance for U.S. Appl. No. 13/657,656 dated May 10, 2016.

(56) References Cited

OTHER PUBLICATIONS

Notice of Allowance for U.S. Appl. No. 13/826,228 dated Mar. 27, 2015.
Notice of Allowance for U.S. Appl. No. 14/302,279 dated Apr. 5, 2016.
Official Communication for Canadian Patent Application No. 2846414 dated Apr. 13, 2016.
Official Communication for European Patent Application No. 14162372.8 dated Apr. 30, 2015.
Official Communication for German Patent Application No. 10 2013 221 052.3 dated Mar. 24, 2015.
Official Communication for German Patent Application No. 10 2013 221 057.4 dated Mar. 23, 2015.
Official Communication for Netherlands Patent Application No. 2012436 dated Nov. 6, 2015.
Official Communication for New Zealand Patent Application No. 623323 dated Apr. 17, 2014.
Official Communication for New Zealand Patent Application No. 623323 dated Jun. 6, 2014.
Official Communication for U.S. Appl. No. 13/196,788 dated Oct. 23, 2015.
Official Communication for U.S. Appl. No. 13/196,788 dated Nov. 25, 2015.
Official Communication for U.S. Appl. No. 13/657,656 dated May 6, 2015.
Official Communication for U.S. Appl. No. 13/657,656 dated Oct. 7, 2014.
Official Communication for U.S. Appl. No. 14/196,814 dated Aug. 13, 2014.
Official Communication for U.S. Appl. No. 14/196,814 dated May 5, 2015.
Official Communication for U.S. Appl. No. 14/196,814 dated Oct. 7, 2015.
Official Communication for U.S. Appl. No. 14/302,279 dated Sep. 24, 2015.
Official Communication for U.S. Appl. No. 14/726,211 dated Apr. 5, 2016.
Official Communication for U.S. Appl. No. 15/168,902 dated Jun. 19, 2017.
Official Communication for U.S. Appl. No. 15/168,902 dated Dec. 2, 2016.
Notice of Allowance for U.S. Appl. No. 15/208,378 dated Jun. 22, 2017.
Official Communication for U.S. Appl. No. 15/208,378 dated Oct. 11, 2016.
Official Communication for U.S. Appl. No. 15/208,378 dated Dec. 13, 2016.
Official Communication for U.S. Appl. No. 15/208,378 dated Mar. 20, 2017.
Official Communication for U.S. Appl. No. 15/168,902 dated Apr. 2, 2018.
Official Communication for U.S. Appl. No. 15/168,902 dated Jan. 2, 2019.

* cited by examiner

SUMMARY    KEYWORDS    REPORTING    HISTORY

☆ 19

🔍 wheat      2 Documents of 15 match

| DATE | TITLE | DESCRIPTION | SOURCE |
|---|---|---|---|
| ▼ 8/24/2013 | 21 | RPT - GRAIN/OILSEED EXPORT PRICES ADJUSTED B... | ☆ 19 |
| | | ...taxes are levied in dlrs per tonne FOB, previous in brackets, as follows: Bran pollard wheat 40 (42), pollets 42... | |
| ▼ 7/27/2012 | 10 | U | ☆ 19 |
| | | ...fiscal 1990 and urged the Reagan administration offer EEP wheat to the Soviet Union. The proposals were ap.... | |
| | | ...30 pct less expensive to operate. The provision on EEP wheat to the Soviet Union, offered by Rep. Bob Smith... | |
| | | ...the Agriculture Secretary conduct a study of the Canadian Wheat Board import licensing system for wheat to ... | |
| | | ...of the Canadian Wheat Board import licensing system for wheat to determine if it is a non-tariff trade barrier.... | |

End of Results

130k

Include All

9 Sources of 43

- ▼ Language Translation   2
  - ☑ N/A   2
  - ☑ Cooking   2
  - ☑ Sharpshooter   1
  - ☑ Swordsmanship   0
  - Show All - 5/11

- ▼ Profession    All - None
  - ☑ N/A   3
  - ☐ ~~Taxi Driver~~   0
  - ☐ Truck Driver   0
  - ☐ ~~Executive Assistant~~   0
  - ☑ Programmer   1
  - ☑ Civil Engineer   2
  - ☑ Worker   2
  - ☑ Sales Associate   0
  - ☑ Member   0
  - ☑ Dealer   1
  - ☑ Diplomat   0
  - ☑ Shopkeeper   1
  - ☑ Officer   0
  - Show Less - 13/13

- ▼ Language
  - ☑ JA - JAPANESE   4

140k

Select All Sources

☆ 32   SAN ANTONIO, TX   2   SA Investigator 1   Open

☆ 19   MIAMI, FL   5   SA Investigator 2   Open

☆ 36   ST. LOUIS, MO   2   SA Investigator 3   Open

☆ 41   ALBANY, NY   5   SA Investigator 4   Open

☆ 53   Washington, DC   5   SA Investigator 5   Open

150k

[ Start Over ]    [ Create Report ]

9 Sources selected

COVERAGE    KEYWORDS    REPORTING

🔍 wheat                                    13 Documents of 133 match

| DATE | TITLE | DESCRIPTION | SOURCE |
|---|---|---|---|
| ▶ 3/1/2015 | 29 | U | ☆ 25 |
| | | ...HWITZ WASHINGTON, March 12 - A marketing loan for U.S. wheat, feedgrains and soybeans would do nothi... | |
| | | ...loan now, "he told the House agriculture subcommittee on wheat, soybeans and leedgrains. Boschwitz was... | |
| ▶ 2/2/2015 | 67 | COMMENTS ON EXPORT SALES WASHINGTON, March 5-... | ☆ 11 |
| | | ...sales to unknown destinations rose by 429,800 tannes. Wheat sales of 362,400 tannes for the current seas... | |
| | | ...sales, it said. Egypt, Japan and Iraq were the major wheat buyers for delivery in the current year, while sal... | |
| ▶ 10/29/2014 | 78 | NO DECISION WASHINGTO... | ☆ 31 |
| | | ...had not decided on offering the Soviet Union subsidized wheat but that such an offer had not been rules ou... | |
| | | ...if the administration had ruled out offering to subsidize wheat exports to the Soviet Union under the depart... | |
| | | ...that there have been reports that Moscow would buy U.S. wheat if competitively prices, Lyng reponded, "t... | |
| ▶ 8/24/2013 | 21 | RPT - GRAIN/OILSEED EXPORT PRICES ADJUSTED B... | ☆ 19 |
| | | ...taxes are levied in dlrs per tonne FOB, previous in brackets, as follows: Bran pollard wheat 40 (42), pollets 42... | |
| ▶ 7/27/2012 | 10 | U | ☆ 19 |
| | | ...fiscal 1990 and urged the Reagan administration offer EEP wheat to the Soviet Union. The proposals were ap... | |
| | | ...30 pct less expensive to operate. The provision on EEP wheat to the Soviet Union, offered by Rep. Bob Smith... | |

[ Start Over ]    [ Create Report ]

150I

---

130I — Include All

9 Sources of 43

- ☑ Language Translation  2
- ☑ N/A  2
- ☑ Cooking  2
- ☑ Sharpshooter  1
- ☑ Swordsmanship  0
- Show All - 5/11

▼ Profession    All - None
- ☑ N/A  3
- ☐ ~~Taxi Driver~~  0
- ☑ Truck Driver  0
- ☐ ~~Executive Assistant~~  0
- ☑ Programmer  1
- ☑ Civil Engineer  2
- ☑ Worker  2
- ☑ Sales Associate  0
- ☑ Member  0
- ☑ Dealer  1
- ☑ Diplomat  0
- ☑ Shopkeeper  1
- ☑ Officer  0
- Show Less - 13/13

▼ Language
- ☑ JA - JAPANESE  4

140I — Select All Sources

- ☆ 32 SAN ANTONIO, TX / 2 / SA Investigator 1 / Open
- ☆ 19 MIAMI, FL / 5 / SA Investigator 2 / Open
- ☆ 36 ST. LOUIS, MO / 2 / SA Investigator 3 / Open
- ☆ 41 ALBANY, NY / 5 / SA Investigator 4 / Open
- ☆ 53 Washington, DC / 5 / SA Investigator 5 / Open

SYSTEM AND USER INTERFACES FOR SEARCHING RESOURCES AND RELATED DOCUMENTS USING DATA STRUCTURES

CROSS-REFERENCE TO RELATED APPLICATIONS

This application is a continuation of U.S. patent application Ser. No. 15/208,378, filed Jul. 12, 2016, entitled "SYSTEM AND USER INTERFACES FOR SEARCHING RESOURCES AND RELATED DOCUMENTS USING DATA STRUCTURES," which application claims benefit of U.S. Provisional Patent Application No. 62/265,919, filed Dec. 10, 2015, and titled "SYSTEM AND USER INTERFACES FOR SEARCHING RESOURCES AND RELATED DOCUMENTS USING DATA STRUCTURES." The entire disclosure of each of the above items is hereby made part of this specification as if set forth fully herein and incorporated by reference for all purposes, for all that it contains.

Any and all applications, if any, for which a foreign or domestic priority claim is identified in the Application Data Sheet of the present application are hereby incorporated by reference under 37 CFR 1.57.

TECHNICAL FIELD

The present disclosure relates to systems and techniques for data integration, analysis, and visualization. More specifically, the present disclosure relates to searching resources and related documents using data structures.

BACKGROUND

Organizations may store information about various resources and related data. The organizations may search for specific resources.

SUMMARY

The systems, methods, and devices described herein each have several aspects, no single one of which is solely responsible for its desirable attributes. Without limiting the scope of this disclosure, several non-limiting features will now be discussed briefly.

In order to identify relevant resources and related documents within a large organization or company, scalability and efficiency can become important factors. Accordingly, certain systems and user interfaces described herein may implement a scalable and efficient searching of large amounts of data relating to resources and documents, for example, by using data structures and data objects. For example, the systems and user interfaces can search for resources and/or documents by searching through properties of resource data objects and/or document data objects as well as properties of other types of data objects that are linked to resource data objects and/or document data objects. The user interfaces may be designed to display large amounts of data in an informative way (e.g., by presenting an aggregate summary) and to interact with users by allowing access to and navigation of varying levels of detail within the same user interface.

In various embodiments, large amounts of data are automatically and dynamically created, processed, and managed interactively in response to user inputs, and the data is efficiently and compactly presented to a user by the system. Thus, in some embodiments, the user interfaces described herein are more efficient as compared to previous user interfaces in which data is not dynamically updated and compactly and efficiently presented to the user in response to interactive inputs.

Further, as described herein, the system may be configured and/or designed to generate user interface data usable for rendering the various interactive user interfaces described. The user interface data may be used by the system, and/or another computer system, device, and/or software program (for example, a browser program), to render the interactive user interfaces. The interactive user interfaces may be displayed on, for example, electronic displays (including, for example, touch-enabled displays).

Additionally, it has been noted that design of computer user interfaces "that are usable and easily learned by humans is a non-trivial problem for software developers." (Dillon, A. (2003) User Interface Design. MacMillan Encyclopedia of Cognitive Science, Vol. 4, London: MacMillan, 453-458.) The various embodiments of interactive and dynamic user interfaces of the present disclosure are the result of significant research, development, improvement, iteration, and/or testing. This non-trivial development has resulted in the user interfaces described herein which may provide significant cognitive and ergonomic efficiencies and advantages over previous systems. The interactive and dynamic user interfaces include improved human-computer interactions that may provide reduced mental workloads, improved decision-making, reduced work stress, and/or the like, for a user. For example, user interaction with the interactive user interfaces described herein may provide an optimized display of information relating to resources and/or documents associated with the resources, and may enable a user to more quickly access, navigate, assess, and digest such information than previous systems.

Various embodiments of the present disclosure are inextricably tied to computer technology. In particular, various embodiments rely on detection of user inputs via graphical user interfaces, determination of updates to displayed electronic data based on those user inputs, automatic processing of electronic data related to resources and documents, and presentation of the updates to displayed data relating to resources and documents via interactive graphical user interfaces. Such features and others (e.g., searching for resources and documents based on properties of respective types of data objects as well as other related data objects, filtering search results using histogram filters, etc.) are intimately tied to, and enabled by, computer technology, and would not exist except for computer technology. For example, the interactions with displayed data described below in reference to various embodiments cannot reasonably be performed by humans alone, without the computer technology upon which they are implemented. Further, the implementation of the various embodiments of the present disclosure via computer technology enables many of the advantages described herein, including more efficient interaction with, and presentation of, various types of electronic data.

According to an embodiment, a system is configured to access one or more electronic data resources in response to inputs received via an interactive user interface in order to search resources of an organization or one or more of documents, events, entities, and other data related to the resources, the system comprising: one or more hardware computer processors configured to execute software code stored in a tangible storage device in order to cause the system to: receive search criteria for identifying resources associated with an organization or one or more of documents, events, entities, or other data associated with the resources, the one or more of the resources, documents, events, entities, or other data represented as respective data objects, wherein the respective data objects can be associated with each other; automatically identify one or more of a subset of the resources, documents, events, entities, or other data that meet the search criteria, wherein the identified resources meet the search criteria or are associated with one or more of the identified documents, events, entities, or other data that meet the search criteria, and wherein the identification is based on one or more of: properties of the resources, properties of the documents, properties of the events, properties of the entities, or properties of other data objects associated with the resources; generate a user interface configured to display the identified resources and attributes associated with the identified resources, the user interface displaying an aggregate summary relating to the identified resources and one or more of the identified documents, events, entities, or other data associated with the identified resources, wherein a histogram bar is displayed in the user interface for each attribute, the histogram bar reflecting a number of the identified resources having the attribute; and in response to selection of one or more attributes in the user interface: filter the identified resources to a subset that meets the one or more attributes; update the user interface to display the subset that meets the one or more attributes; and update the histogram bars of the attributes to reflect a number of resources having respective attribute in the subset that meets the one or more attributes.

According to an aspect, the identified documents meet the search criteria or are associated with the identified resources that meet the search criteria.

According to another aspect, the identified events, entities, or other data meet the search criteria or are associated with the identified resources that meet the search criteria.

According to yet another aspect, the search criteria for identifying the resources, documents, events, entities, or other data include one or more of: first search criteria relating to the resources, second search criteria relating to the documents, third search criteria relating to the events, fourth search criteria relating to the entities, or other search criteria relating to the other data.

According to another aspect, some of the first search criteria relating to the resources are based on the properties of other data objects associated with the resources.

According to yet another aspect, the identified resources include one or more of: resources that meet the first search criteria relating to the resources, resources that are associated with documents that meet the second search criteria relating to the documents, resources that are associated with events that meet the third search criteria relating to the events, resources that are associated with entities that meet the fourth search criteria relating to the entities, or resources that are associated with other data that meet the other search criteria relating to the other data.

According to another aspect, the identified documents include one or more of: documents that meet the second search criteria relating the documents, documents that are associated with resources that meet the first search criteria relating to the resources, documents that are associated with events that meet the third search criteria relating to the events, documents that are associated with entities that meet the fourth search criteria relating to the entities, or documents that are associated with other data that meet the other search criteria relating to the other data.

According to yet another aspect, the user interface comprises a first pane for displaying the identified resources and a second pane for displaying information associated with one or more selected resources of the identified resources.

According to another aspect, one or more resources of the identified resources are selected in the first pane and one or more documents associated with the one or more selected resources are displayed in the second pane.

According to yet another aspect, the one or more documents meet the search criteria.

According to another aspect, the one or more events, entities, or other data meet the search criteria.

According to yet another aspect, the code is further configured to: in response to exclusion of second one or more attributes in the user interface: filter the identified resources to a second subset that does not meet the second one or more attributes; update the user interface to display the second subset; and update the histogram bars of the attributes to reflect a number of resources having respective attribute in the second subset.

Additional embodiments of the disclosure are described below in reference to the appended claims, which may serve as an additional summary of the disclosure.

In various embodiments, computer systems are disclosed that comprise one or more hardware computer processors in communication with one or more non-transitory computer readable storage devices, wherein the one or more hardware computer processors are configured to execute the plurality of computer executable instructions in order to cause the computer system to operations comprising one or more aspects of the above-described embodiments (including one or more aspects of the appended claims).

In various embodiments, computer-implemented methods are disclosed in which, under control of one or more hardware computing devices configured with specific computer executable instructions, one or more aspects of the above-described embodiments (including one or more aspects of the appended claims) are implemented and/or performed.

In various embodiments, computer readable storage mediums storing software instructions are disclosed, wherein, in response to execution by a computing system having one or more hardware processors, the software instructions configure the computing system to perform operations comprising one or more aspects of the above-described embodiments (including one or more aspects of the appended claims).

DETAILED DESCRIPTION

Figure 1A:
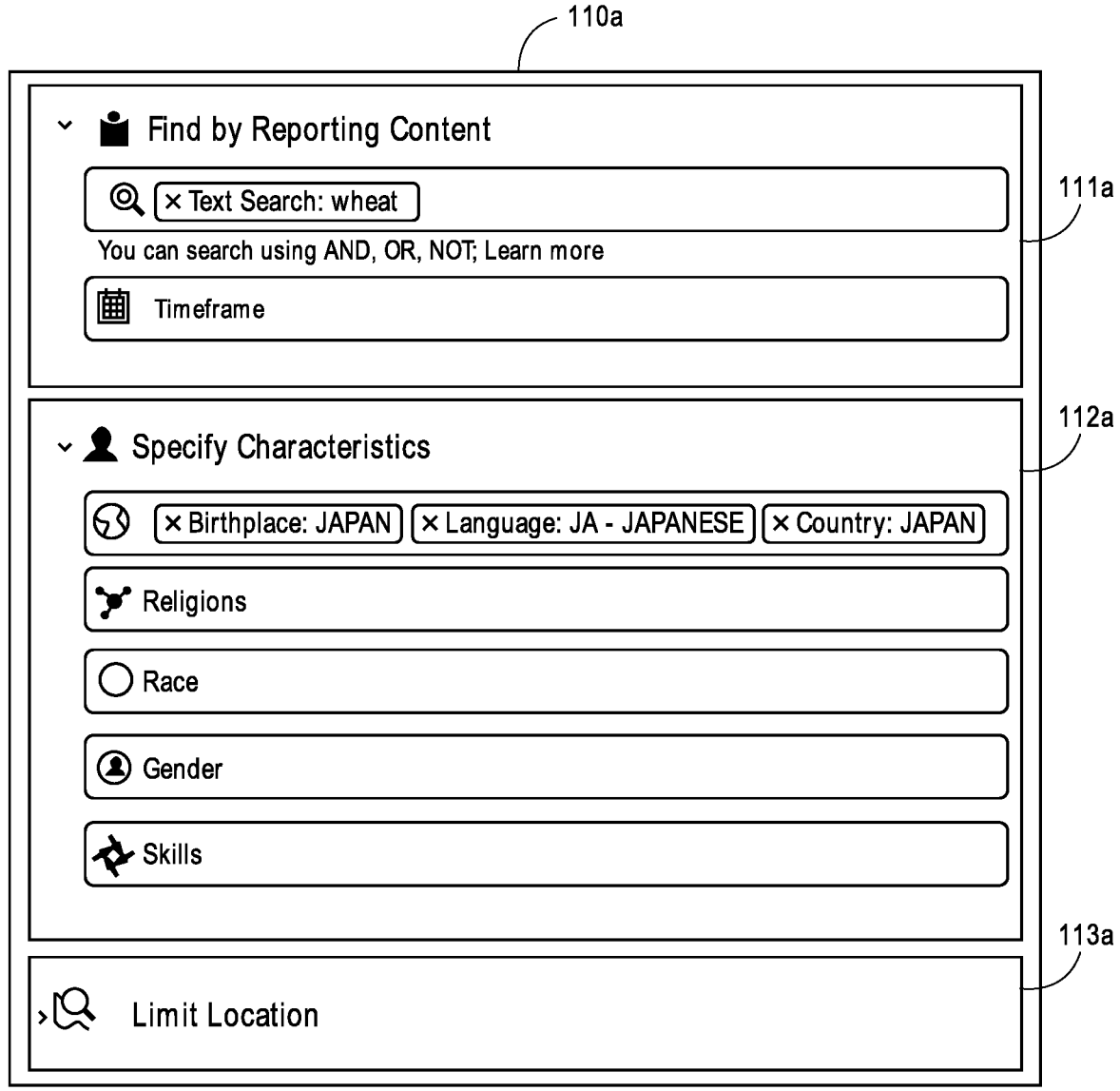
FIGS. 1A-1O illustrate one embodiment of a user interface of a search system for searching resources and related documents using data structures.

In some cases, an organization may want to search for relevant resources the organization has access to (e.g., relating to a particular topic) and also find out about the ability of the organization to provide or collect information relating to particular entities or subject matter. An organization may be any entity, such as a person, a group, a company, a business, an investigative group/company, a research institution, a law enforcement agency, etc. Resources may have related information associated with them. Such related information may include, for example, documents, reports, events, entities, any other types of data, and/or the like. For example, in the context of a law enforcement agency, resources may be sources or informants, and information related to the resources may include documents (e.g., documents related to information provided by the sources or informants), events, other entities of interest, and/or the like. In another example, in the context of a research institution, a resource may be a researcher, and information related to the researcher may include documents, studies, events, other entities of interest, and/or the like. Previous systems may store data about resources, documents, events, entities, and other information relating to resources, but may not provide an effective way to search the resources, documents, events, entities, and other related information in an integrated manner. Accordingly, it would be advantageous to provide a system to search resources and/or related documents, events, entities, or other information in an efficient manner.

In order to address these and other challenges, disclosed herein are various systems and methods for searching resources and related information (e.g., documents, events, other entities, etc.) using data structures, which can be enabled by technical, interactive user interfaces. According to certain aspects, a search system ("SS") can provide integrated searching of resources and information associated with resources, for example, based on search criteria relating to resources and/or related information. Resources and related information may be represented by respective types of data objects, and each type of data object can have one or more properties associated with the type. After receiving search criteria (e.g., from a user), the system can search the properties of resource data objects and/or related information data objects in order to identify resources and/or related information (e.g., documents, events, other entities, etc.) that meet the search criteria. The system may also use other types of data objects that can be associated with resource data objects and/or related information data objects, and in such case, the system can also search the properties of other data objects related to resource data objects and/or related information data objects. By allowing the search criteria to relate to different types of data (e.g., resources, documents, events, other entities, and other related information), the system can provide thorough search results. The search results can be robust because they can include (1) resources that meet the search criteria and documents, events, other entities, and other information related to these resources, (2) related information that meet the search criteria and resources, events, other entities, or other information related to these related information, or any data of a certain type in the system that meets the search criteria and all other data of other types related to such data. The search criteria can include criteria that are applicable to resources, or criteria that are applicable to documents, or both.

As mentioned above, related information (e.g., information related to resources) processed by the system may include various types of data (e.g., documents, events, other entities, etc.). In the interest of conciseness and clarity, much of the description below refers to "documents" and/or "related document" as a primary type of related information. However, it is to be understood that the description below may be applied to any type of related information.

As further mentioned above, the system may be used by many different types of organizations or entities, in many different contexts. In the interest of conciseness and clarity, much of the description below describes the system in the context of a law enforcement agency. However, it is to be understood that the description below may be applied in any context, and may be used by any type of entity.

The system can display the search results in a user interface, for example, in order to provide an overview of the resources and related documents. The user interface can be organized in a way that makes it easy for users to process or understand large amounts of data and obtain relevant information at a glance. For example, the user interface can display resources included in the search results in a first pane and display aggregate information about the resources included in the search results in a second pane. The user interface may also display specific information about a selected resource in the second pane, for example, in response to user input. The user interface can also display specific information about documents in the second pane. In this way, the system can provide a tiered user interface that includes a section for resources and a section for documents and other relevant information relating to resources. The user interface can also allow users to navigate information at different levels within the same user interface. For example, in response to user input, the user interface may present details about a particular document, event, or other related data within the same interface. The user interface may also allow users to create new documents or add new resources within the same user interface.

In this manner, the system can provide a way of searching for resources and documents in an integrated manner. Unlike previous systems, which may require users to search for resources and documents separately, then manually cross-reference the resources and the documents, or may require users to perform separate searches through multiple datasets for resources and/or documents, then manually cross-reference the results, the system can automatically cross-reference related resources and documents across multiple datasets. The system can also provide valuable summary about resources and documents, for example, as explained in connection with the figures below. According to certain aspects, the ability to search for available and relevant resources an organization has access to may be referred to as a "tactical workflow," and the ability to determine the distribution and capability of a set of resources to meet business demands of an organization may be referred to as a "strategic workflow." The system may support both tactical workflows and strategic workflows. The system can provide an efficient way of searching for relevant resources and documents. Also, the system can provide an efficient and effective way of determining the ability of the organization to produce different information through aggregate summary and overview associated with the search results. Certain details relating to the project resourcing system are explained below, for example, in connection with FIGS. 1A-1O and 2-9.

Exemplary User Interfaces of the Search System

FIGS. 1A-1O illustrate one embodiment of a user interface of a search system for searching resources and related documents using data structures. In the figures and corresponding descriptions, resources are shown and described as sources or informants for illustrative purposes, but the system can accommodate any type of resource. Also, documents are used as an example of data related to resources, but the system can use any type of data that is associated with resources. In order to facilitate description, the examples described in connection with the figures are provided in the context of a law enforcement agency. A law enforcement agency may work with various sources or informants in order to obtain tips or information, and sources can be the resources in the context of a law enforcement agency. Accordingly, resources may be referred to as "sources" in the description below. Various investigators can work with different sources and generate documents, reports, and/or any other type of related information based on the obtained tips or information. A law enforcement agency may have various locations, which may be referred to as "offices."

FIG. 1A illustrates a user interface 110a for entering search criteria for identifying resources and/or documents. The user interface 110a includes a section for entering criteria relating to documents 111a and also a section for entering criteria relating to sources 112a. The user interface 110 can also include a section for entering criteria relating to locations 113a. The search criteria relating to documents can include text search (e.g., keyword search), document properties or metadata, timeframe, etc. The search criteria relating to sources can include birthplace, travel countries, languages, religions, race, gender, skills, etc. The search criteria relating to location can include office, group, city, state, country, etc. The search criteria can include any type of criteria that can be used in searching for resources and documents. By allowing search criteria relating to multiple types of data objects, the system can return a wide range of data in the search results. In some embodiments, the user interface 110a can also provide a way to locate a source directly by the number for the source.

Different types of information can be entered using separate fields. Certain types of information that are related can be grouped into one field such that values or keywords can auto-complete together. For example, the first field in the source section 112a relates to birthplace, travel countries, and languages. These fields may be sufficiently related so that it would be beneficial to auto-complete values for the field based on all of these attributes or properties, rather than having an individual field for each one. For instance, if an investigator is looking for someone for an operation in Japan, it may be useful to find sources who were born in Japan, traveled to Japan, speak Japanese, or who are related to events or objects related to Japan. In the example of FIG. 1A, the first field has the values "Birthplace: Japan," "Language: JA—Japanese," and "Country: Japan." Also, "wheat" is entered as the text search keyword in the document section 111a.

Figure 1B:
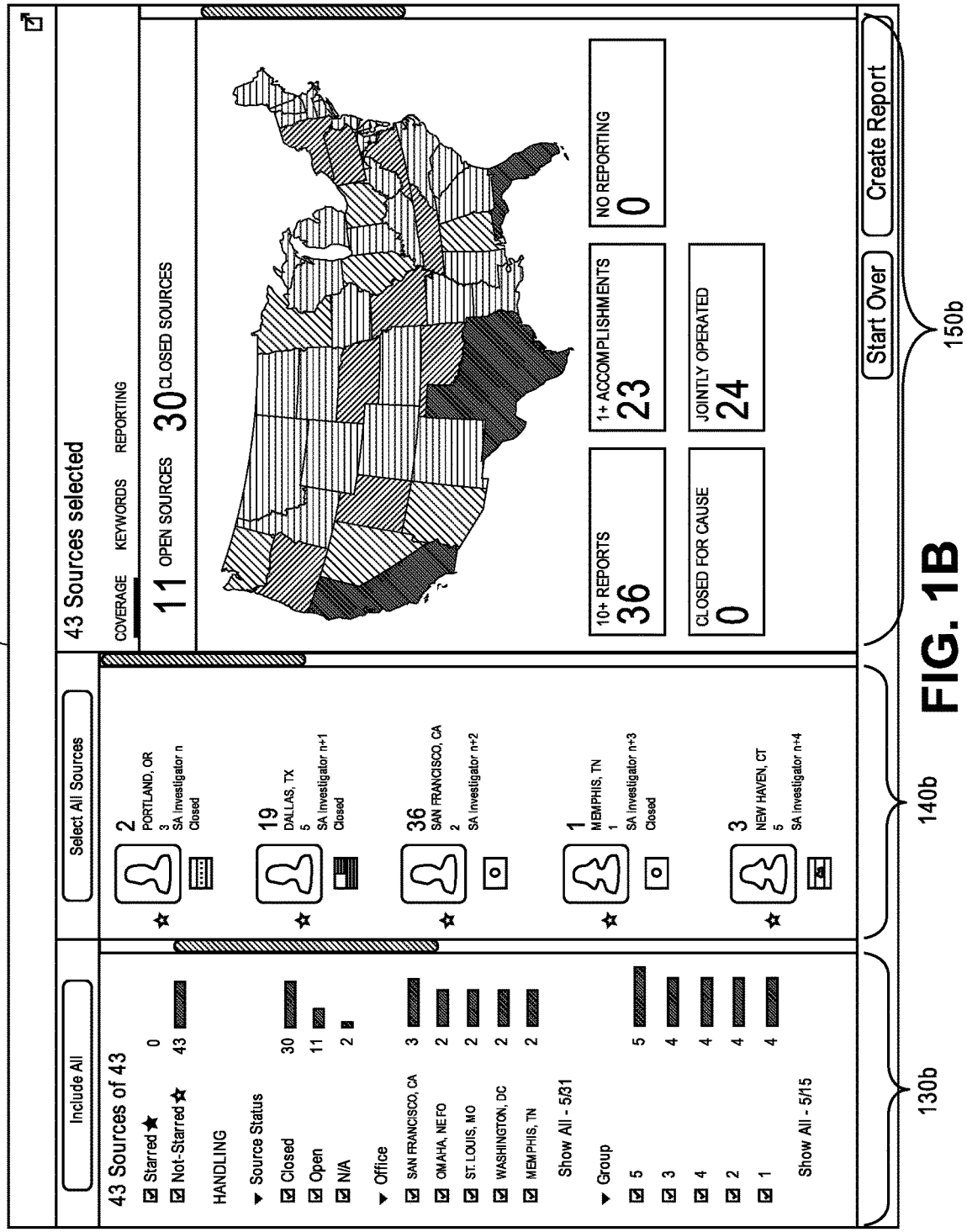

FIG. 1B illustrates a user interface 120b for displaying results of the search based on the search criteria. The user interface 120b can include an attributes pane 130b, which displays various attributes associated with the sources and/or documents included in the search results. The attributes can be grouped according to category. For example, the source status category can include attributes such as closed, open, and N/A. The attributes can be used to filter the search results further, e.g., by selecting or deselecting checkboxes. The attributes may be linked to properties of data objects, such as source data objects. Each attribute may be displayed with a histogram and the number or count of sources that have the attribute. For instance, "Open" attribute under the "Source Status" category is displayed with a histogram as well as the number of sources having the "Open" attribute. For attributes belonging to the same category, the histogram bars for the attributes can be proportionately sized, for example, to indicate distribution of sources having each attribute within the category.

The user interface 120b can also include a source pane 140b, which displays the sources included in the search results. The source pane 140b can display information relating to sources, such as source number or identifier, office related to source, investigator related to source, group related to source, source status (e.g., open or closed), etc. The search pane 140b can also display an icon indicating the gender of the source and an icon indicating the birthplace or nationality of the source. Because identity of sources should be confidential, names of the sources are not shown, but other characteristics can be shown to allow users to quickly gather relevant information about the sources. The types of information included in the user interface in a resource pane is entirely configurable and can be any information relevant to the workflow for which the system is being used.

As indicated by the stars of the search pane 140b, the system may allow users to star or otherwise distinguish certain sources of interest from the other sources, and to reference starred sources at a later point in time and perform analysis, searching, or visualizations on starred sources. For instance, users may star their favorite sources, useful sources, or sources of interest related to a particular search, investigation, or inquiry.

The user interface 120b may also include a details pane 150b, which can show different types of information relating to sources and documents. Initially or when multiple sources are selected, the details pane 150b can provide an aggregate summary about the sources. In the example of FIG. 1B, the details pane 150b displays a map of the U.S. showing the distribution of sources in different states. For example, states with the number of sources within a first range are shown in one color, states with the number of sources within a second range are shown in another color, and so forth. The map can provide instantaneous information about where sources are located geographically. The details pane 150b can also show important metrics about the sources, such as number of sources with 10 or more reports, number of sources with one or more accomplishments (e.g., recognition by the law enforcement agency), number of sources with no reports, number of sources closed for cause, number of sources jointly operated, etc. The types of information included in the user interface in a details pane is entirely configurable and can be any information relevant to the workflow for which the system is being used.

Figure 1C:
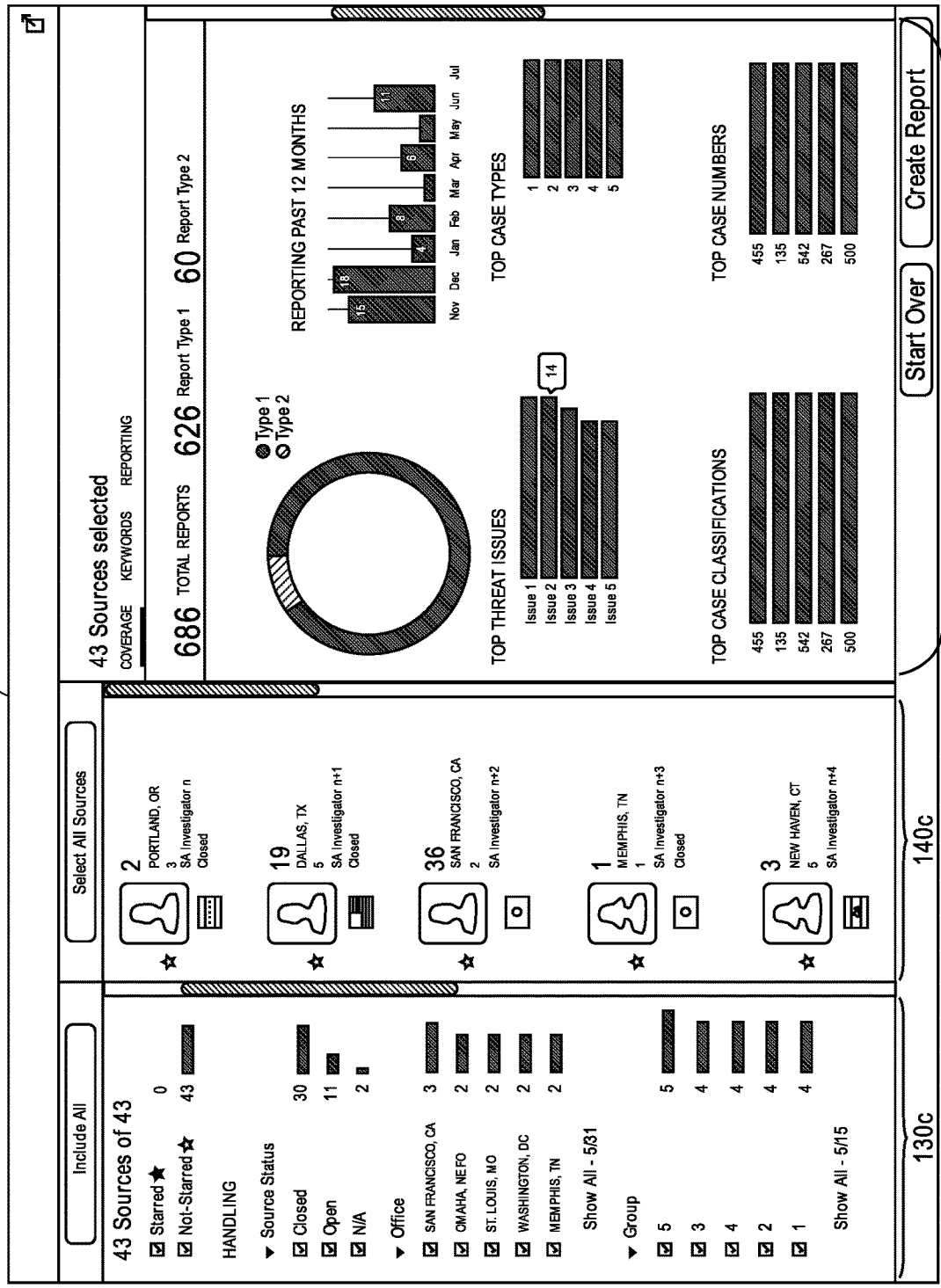

FIG. 1C illustrates a version 120c of the user interface 120b in FIG. 1B with the details pane 150b scrolled down. The user interface 120c displays additional metrics relating to the sources in the details pane 150c, such as total number of reports by sources, total number of report of type 1 by sources, total number of reports of type 2 by sources, etc. Type 1 and Type 2 can refer to different types of reports that are generated within the law enforcement agency. Reports may refer to a tip or information from a source, or may also refer to documents that are created from such tip or information, depending on the embodiment. The details pane 150c can also display various charts and graphs that visualize aggregate information. For example, the details pane 150c can show a ring chart for the types of reports, a bar graph relating to number of reports within past 12 months, a bar graph showing top threat issues, a bar graph showing top case types for sources, a bar graph showing top case classifications, a bar graph showing top case numbers, etc. The aggregate information about multiple sources can be used to show coverage associated with the sources. The types of information included in the user interface in a details pane is entirely configurable and can be any information relevant to the workflow for which the system is being used.

Figure 1D:
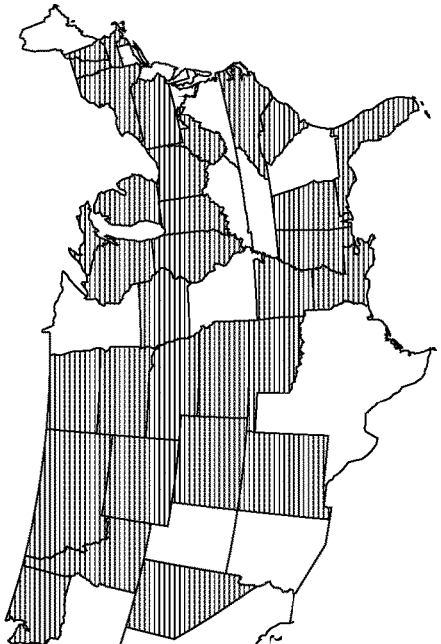

FIG. 1D illustrates a user interface 120d in which certain attributes are selected in the attributes pane 130d. In the example of FIG. 1D, "Open" attribute is selected under "Source Status" category; "San Francisco, Calif.," "St. Louis, Mo.," and "Memphis, Tenn." attributes are selected under the "Office" category; and "5," "3," "6," and "1" attributes are selected under the "Group" category. The selected attributes may be used as search criteria or faceting criteria. For example, faceting criteria may be used to filter the search results using multiple filters, e.g., along different dimensions. The details pane 150d is updated to show that the results have been filtered down to 11 sources. The metrics shown in the details pane 150d are updated to reflect the filtered sources. When attributes are selected for filtering, the search or filtering may be referred to as "opting in." The types of information included in the user interface in an attributes pane is entirely configurable and can be any information relevant to the workflow for which the system is being used.

In the attributes pane 130d, the histogram bars for each attribute may updated to reflect the number of filtered sources having the attribute. For example, in the example of FIG. 1B, 3 sources in the search results are related to the San Francisco office, and in the example of FIG. 1D, 1 source in the filtered results is related to the San Francisco office. The histogram bar can be filled in proportionately to show how many of the filtered sources have the attribute compared to how many of the sources in the original search results have the attribute. For instance, in the example of FIG. 1D, the histogram bar remains the same size as in the example of FIG. 1B, but is marked proportionate to 1 source (e.g., ⅓ of the histogram bar). The number of sources having the attribute can also be updated to reflect the number of filtered sources having the attribute (e.g., 1).

Figure 1E:
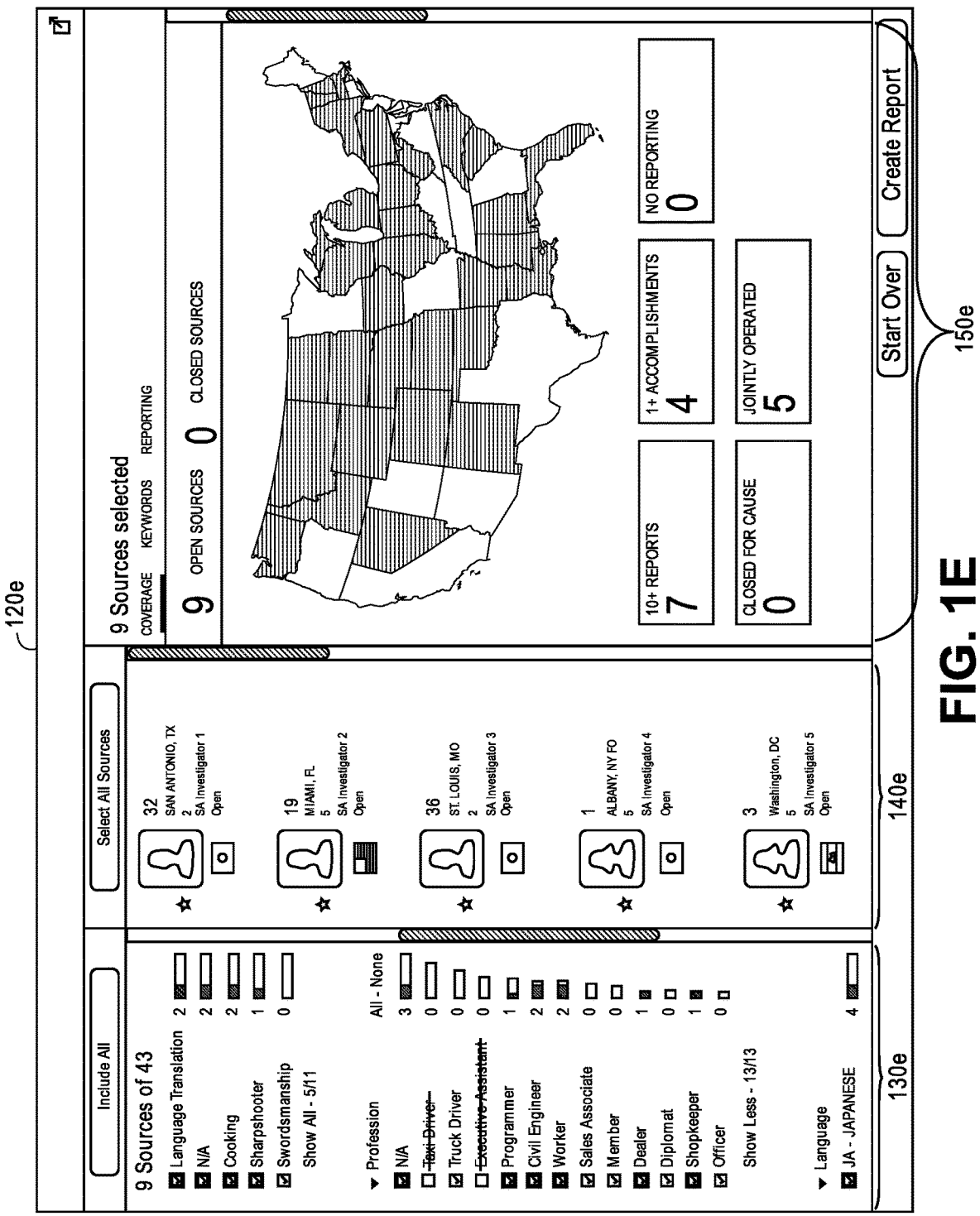

FIG. 1E illustrates a user interface 120e in which certain attributes are excluded or removed in the attributes pane 130e. In some cases, users may want to filter for items that do not have certain attributes. For example, an employee may want to see all sources in the search results that are not taxi drivers or executive assistants. In such cases, the corresponding attributes may be excluded or removed, and the search results can be filtered to include only the sources that do not have the attributes. In one embodiment, the attributes that are excluded are shown in strikethrough. In the example of FIG. 1E, attributes "Taxi Driver" and "Executive Assistant" are shown as being removed. When attributes are excluded for filtering, the search or filtering may be referred to as "opting out." The details pane 150e is updated to show that the results have been filtered down to 9 sources. The metrics shown in the details pane 150e are updated to reflect the filtered sources. The histogram bars next to each attribute and the number of sources having the attribute are also updated accordingly, for example, as explained in connection with FIG. 1D above.

Users may select and/or remove multiple attributes at one time (e.g., within a particular period of time or time window), and the system can update the user interface at one time. For example, the system can accumulate the user input and refresh once in order to avoid continuous updates and make the user interface operate more smoothly.

In addition, in certain implementations the system may assist the user in selecting filters that provide useful results. For example, if the user has selected a number of filters such that all the remaining sources have a given attribute, the system may disallow the user from deselecting the attribute for filtering (e.g., by greying out that attribute). Thus, for example, if all remaining sources (e.g., after a number of filters are applied) are "Sales Associates" (e.g., such that deselecting the "Sales Associate" attribute would result in zero matching sources), the system may determine that this is the case and in response grey out the checkbox associated with the "Sales Associate" attribute. Thus, in this implementation, the system would not allow users to filter down to zero sources, thereby enabling the user to more efficiently and intelligently determine results of interest.

In certain embodiments, the attributes displayed in the attributes pane 130 may be referred to as histogram filters or histo filters since histogram bars can be used in filtering of the search results.

Figure 1F:
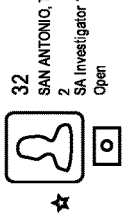

FIG. 1F illustrates a user interface 120f in which a summary about a source is displayed. The details pane 150f can also be used to display information about a particular source (e.g., selected source). The details pane 150f can include various tabs, such as summary, reporting, keywords, history, etc. The summary about a source can be displayed under the summary tab. The summary may include metrics about a particular source. The metrics can be similar to the metrics displayed in the aggregate information as discussed above. In the example of FIG. 1F, the details pane 150f shows a chart of the source's reporting during the past 12 months. One axis can show the months, and the other axis can show the number of reports. The details pane 150f also shows various characteristics about the source, such as the office, group, investigator, division, program, sub-program, status, gender, race, birthplace, language, religion, job title, skills, zip codes, etc. The types of information included in the user interface in a details pane is entirely configurable and can be any information relevant to the workflow for which the system is being used.

As mentioned above, the system may allow users to star sources from the source pane 140f, and/or also from the details pane 150f.

In the figures, values for certain fields are displayed with a letter "U" next to them. "U" can indicate that the values are unclassified. Each field may have a security setting associated with it, and the system can show the security level in the user interface 120 using various indicators. For example, "S" can indicate that secret, and "TS" can indicate top secret. The security settings may be specified for each field, for each object, or for each application. Certain details relating to security and permissions are explained below, for example, in connection with FIG. 2. The classification, access, or security scheme is entirely configurable and can be any scheme relevant to the workflow for which the system is being used. In some implementations, the classification, access, or security scheme may be implemented based on an access control list (ACL) or similar system. An ACL is a set of one or more permissions that govern use (e.g., read access, write access, etc.) of the associated information that may be displayed and/or otherwise access by the user. For example, a permission may specify a set of one or more trustees (e.g., a user) and one or more use rights (e.g., read access, write access, etc.) of those trustees with respect to a data item. As another example, a permission may specify a minimum security classification level (e.g., unclassified, secret, top secret, or a particular job title or position) such that only users that possess the minimum security classification level can use (e.g., read, write, etc.) data items that are related to a particular subject, that originate from a particular source, and/or the like Additional examples of Access Control Lists and ACL features, and systems for generating ACLs as described herein, may be found in U.S. Pat. No. 8,527,461 titled "CROSS-ACL MULTI-MASTER REPLICATION" filed Nov. 27, 2012, U.S. Pat. No. 8,688,749 titled "CROSS-ONTOLOGY MULTI-MASTER REPLICATION" filed Mar. 31, 2011, U.S. Pat. No. 9,081,975 titled "SHARING INFORMATION BETWEEN NEXUSES THAT USE DIFFERENT CLASSIFICATION SCHEMES FOR INFORMATION ACCESS CONTROL" filed Oct. 22, 2012, and U.S. Pat. No. 8,838,538 titled "TECHNIQUES FOR REPLICATING CHANGES TO ACCESS CONTROL LISTS ON INVESTIGATIVE ANALYSIS DATA" filed Jul. 31, 2013, the entire disclosure of each of which is hereby made part of this specification as if set forth fully herein and incorporated by reference for all purposes, for all that it contains.

Figure 1G:
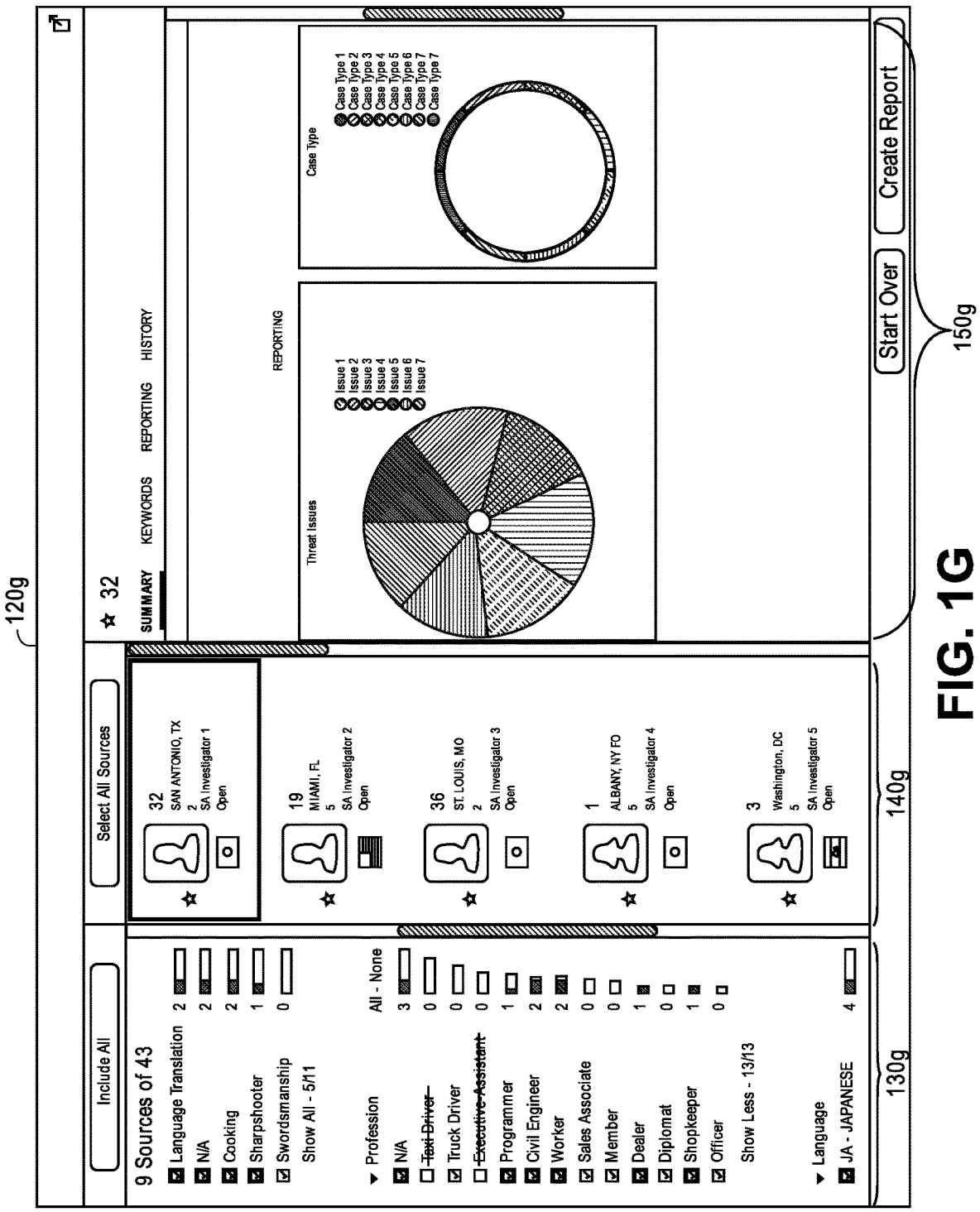

FIG. 1G illustrates a version 120g of the user interface 120f in FIG. 1F with the details pane 150f scrolled down. In the example of FIG. 1G, the details pane 150g displays threat issues (e.g., a type of threat represented by an item of related information (such as a document)) and case types related to the source. In certain embodiments, case types may refer to abilities of sources or case types for particular sources.

Figure 1H:

FIG. 1H illustrates a user interface 120h in which history of a source is displayed. The history of events (e.g., activities, etc.) relating to a source, such as reporting and travel requests, can be displayed under the history tab in the details pane 150h. The history can be represented by a timeline, e.g., chronological or reverse chronological. In the example of FIG. 1H, the timeline is displayed vertically, for example, with older activities at the top and more recent activities at the bottom. Type of events/activities may include reports, travel requests, accomplishments, or other types of events (e.g., source opening, source closing, etc.). In some embodiments, source opening and source closing are represented as events.

Figure 1I:
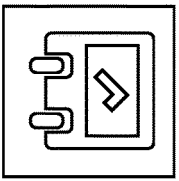

FIG. 1I illustrates a user interface 120i in which an event related to a source is displayed. In the example of FIG. 1I, the event is a travel event. When the user clicks on a travel event, e.g., on the history timeline shown in FIG. 1H, a pop-up pane or window 160i can be shown to display the details for the event. In the example of FIG. 1I, the travel event has properties such as country, travel end date, travel start date, travel type, etc.

Figure 1J:
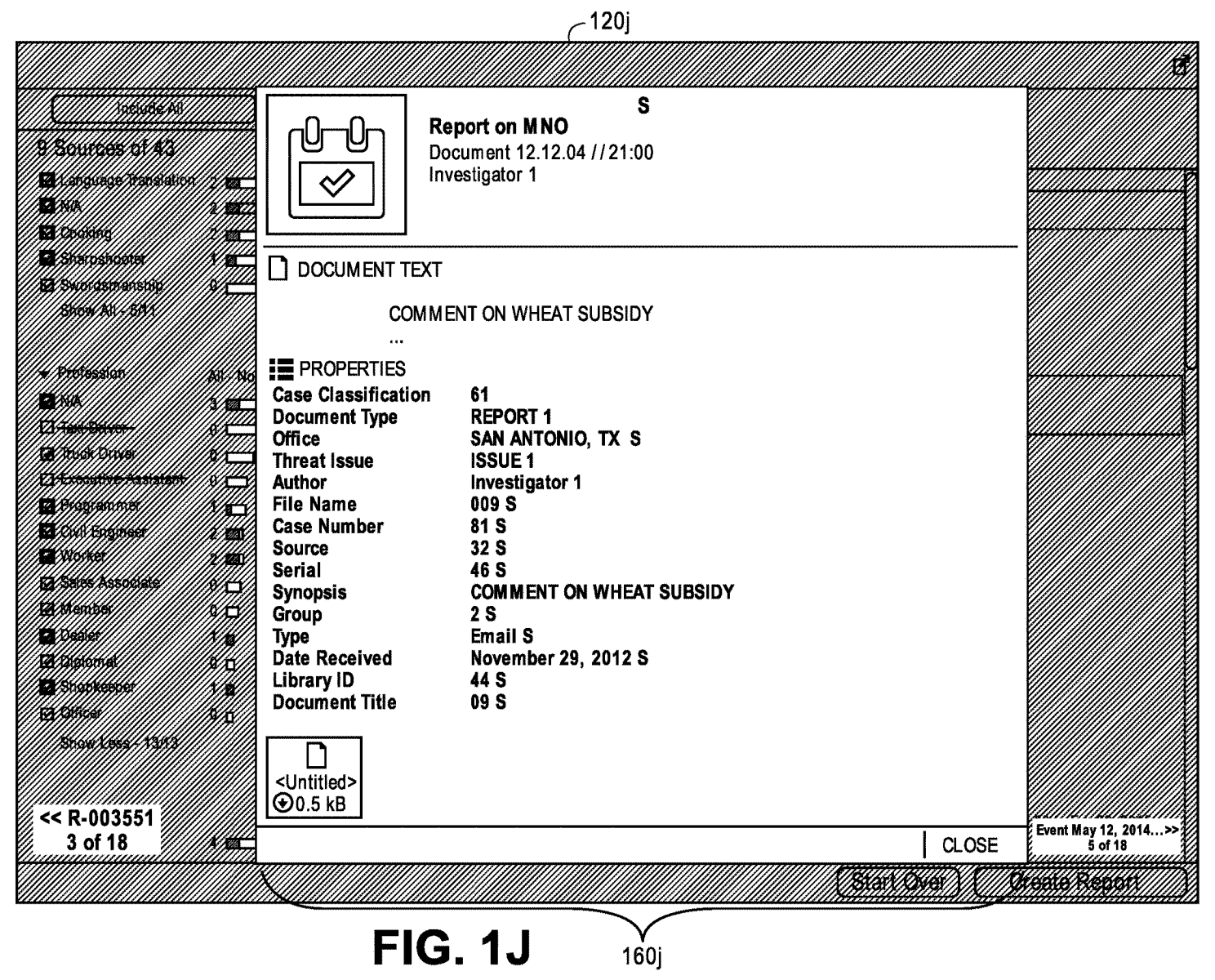

FIG. 1J illustrates a user interface 120j in which a document related to a source is displayed. In the example of FIG. 1J, the document is a report. When the user clicks on a document, for example, on the history timeline shown in FIG. 1J, a pop-up pane or window 170j can be shown to display the details for the document. In the example of FIG. 1J, the pane 170j can display the document text, properties, related files, etc. The document can have properties such as case classification, case type, document type (e.g., report Type 1, report Type 2, etc.), office, threat issue, author, file name, case number, source, serial (e.g., document number), synopsis (e.g., title, summary, short description, etc. for the content of the document), group, type, date received, library ID, document title, etc. The pane 170j can be similar to the pane 160i in FIG. 1I. The pane 160i and 170j may be used to show the content of or details about an item on the history timeline. The user may review or go through each item shown on the timeline using the pane 160i, 170j without going back to the main user interface 120. For example, if the user clicked to view details about an item, and the pane 160i, 170j is displayed, the user can page up and down, or page left and right to navigate through the items on the timeline within the pane 160i and 170i. In some embodiments, the user may also click on the arrows shown on the left and right sides of the user interface 120i and 120j. The user may access the source associated with an item from the pane 160i and 170i, e.g., by clicking on the source number.

FIG. 1K illustrates a user interface 120k in which a summary of documents related to a source is displayed. Documents originating from a source can be displayed under the reporting tab in the details pane 150k. Each document may be displayed with all instances of the keywords within the document. This can make it easy for users to quickly determine the relevance of a document without having to look at the details or content of the document (e.g., by clicking on the document). The system can show the context around all instances of the keywords. Sources can also be starred in the source pane 140k, and the user can reference starred sources at a later point in time and perform searches, analysis, and visualizations on starred sources. In the example of FIG. 1K, the details pane 150k shows each instance of the term "wheat," which was entered in the document section 111a in FIG. 1A, as well as the context around each instance. Some systems may only show the context for a particular instance of the keywords (e.g., first instance), which would not provide all relevant information in the details pane 150.

In some embodiments, the user can search for another keyword for a selected source, e.g., under the reporting tab. If the user enters a different search term, the search results can update to show documents containing the new search term. In this manner, the user may search for documents of a source that include new keywords without going back to the user interface 110a in FIG. 1A.

As mentioned above, the system may allow users to star sources from the source pane 140k, and/or also from the details pane 150k. For example, users can star the sources from the summary tab since each document is listed with the source.

FIG. 1L illustrates a user interface 120l in which a summary of documents related to multiple sources is displayed. When multiple sources are selected, documents originating from a source can be displayed under the reporting tab in the details pane 150l. The user interface 120l can be similar to the user interface 120k in FIG. 1K. As explained above, each document can be displayed with all instances of the keywords within the document.

As mentioned above, the system may allow users to star sources from the source pane 140l, and/or also from the details pane 150l. For example, users can star the sources from the reporting tab since each document is listed with the source.

Figure 1M:
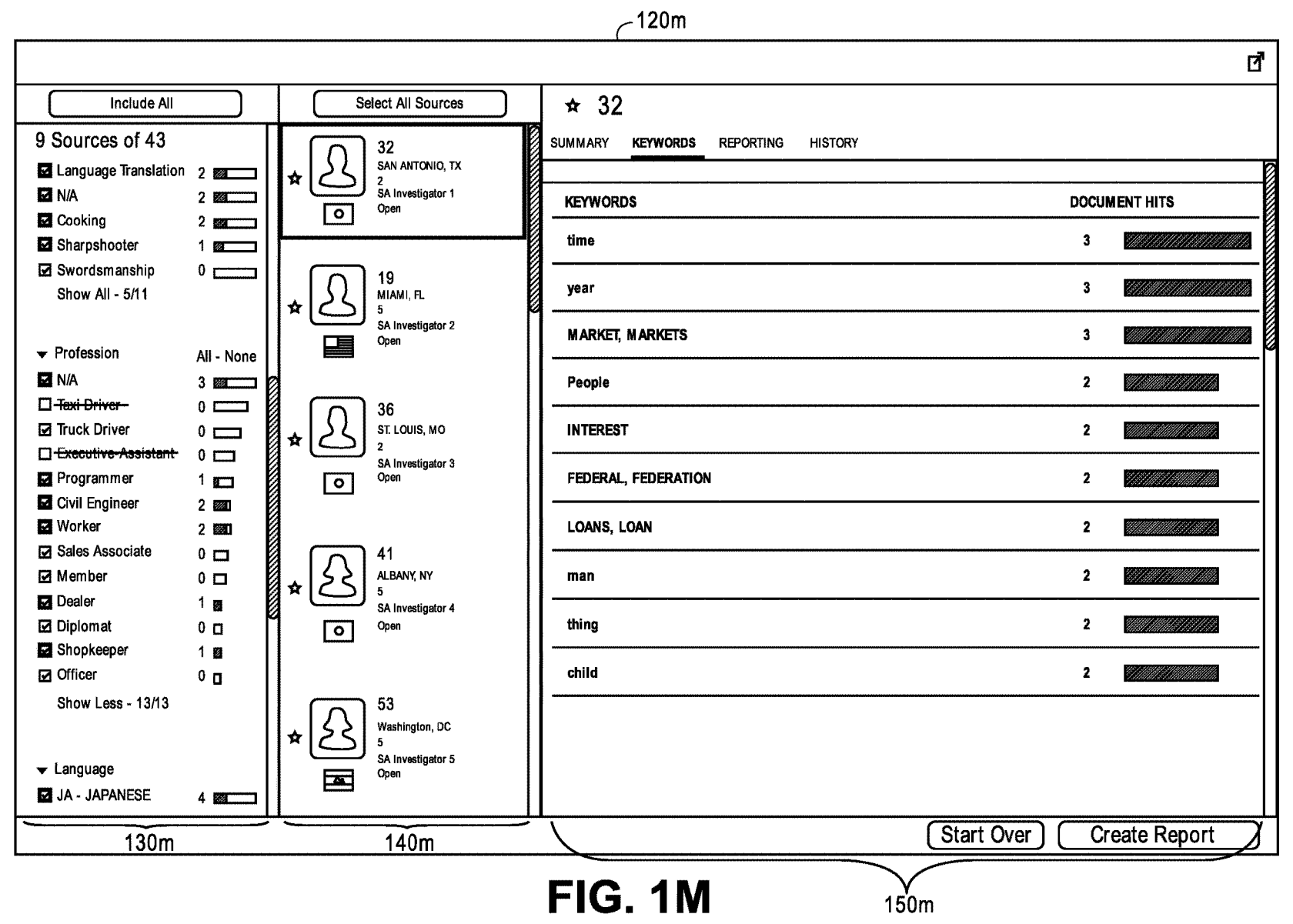

FIG. 1M illustrates a user interface 120m in which a summary of keywords related to a source is displayed. Keywords found in documents related to a source can be displayed under the keywords tab in the details pane 150*m*. The keywords may be displayed alphabetically, from most common to least common, etc. These keywords may not be related to what was entered as the search criteria, e.g., in FIG. 1A. Rather, the keywords tab can provide a summary of which keywords are found in the documents related to the source. In some embodiments, most common words are extracted and displayed. The keywords may or may not include the keywords in the search criteria, depending on the embodiment. Variations of a word may appear together as a group. For example, FIG. 1M shows "market" and "markets" in the same line, "federal" and "federation" in the same line, and "loans" and "loan" in the same line. The user interface 120*m* can also show the number of documents that contain the keyword for each keyword or group of related keywords.

Figure 1N:
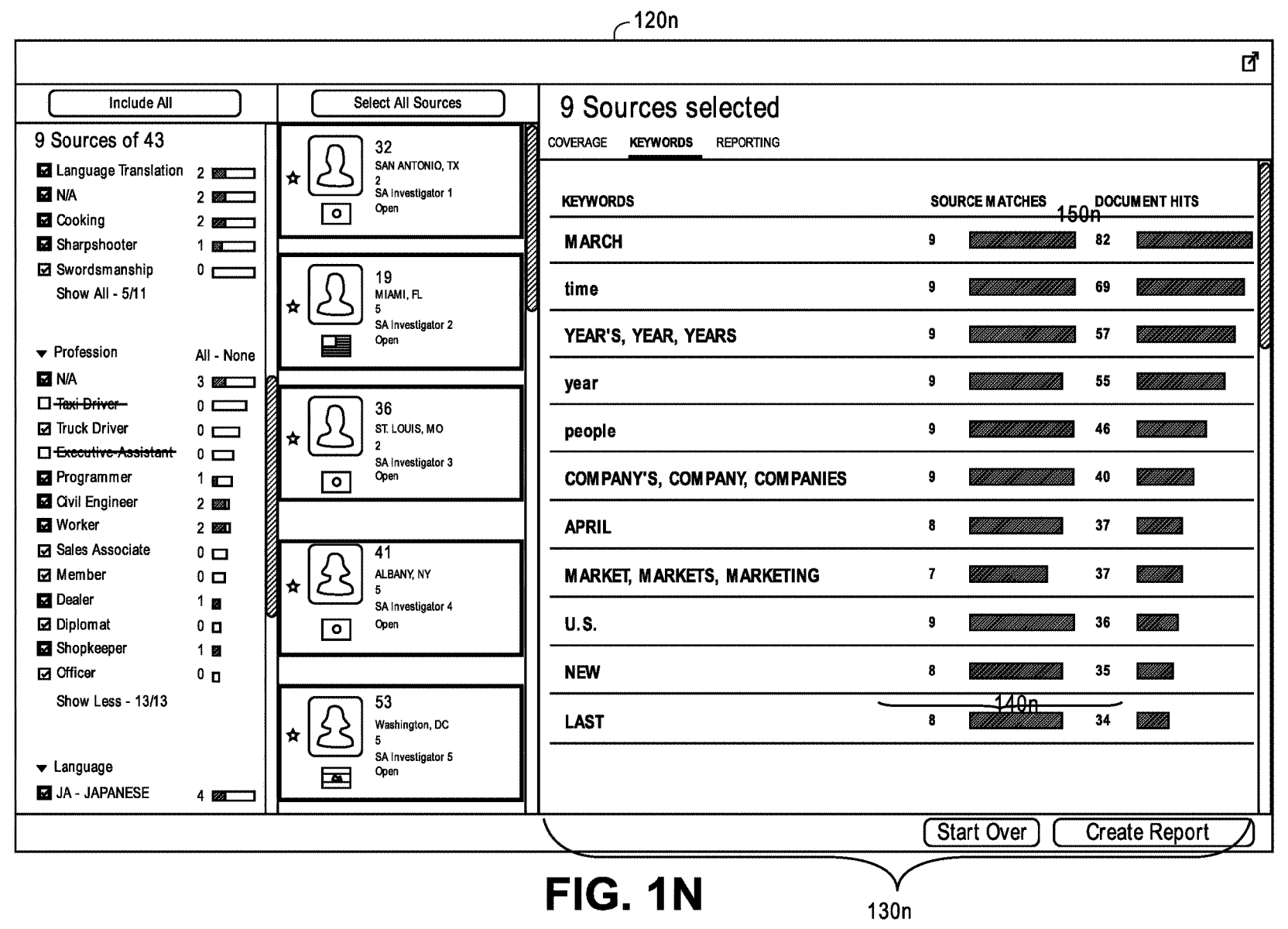

FIG. 1N illustrates a user interface 120*n* in which a summary of documents related to multiple sources is displayed. When multiple sources are selected, keywords found in documents related to the sources can be displayed under the keywords tab in the details pane 150*n*. The user interface 120*n* can be similar to the user interface 120*m* in FIG. 1M. The user interface 120*n* may show the number of sources that match the keywords, in addition to the number of documents that match the keywords.

When a single source is selected in the source pane 140, the details pane 150 can show information about the single source. The details pane 150 can include different tabs, such as the summary tab, the reporting tab, the keyword tab, and the history tab. For example, the history tab shows reports, events, and other types of data related to a particular source. The details pane 150 can include different types of tabs depending on the embodiment. When multiple sources are selected in the source pane 140, the details pane 150 can show aggregate information about the multiple sources, and the details pane 150 may include tabs that are a bit different from the tabs shown when a single source is selected. For example, the tabs include the coverage tab, the reporting tab, and the keyword tab. The coverage tab can include aggregate information about multiple selected sources, and the reporting tab and the keywords tab can similar to the reporting tab and the keywords tab for a single source, except the details pane 150 includes reports and keywords for all selected sources. The details pane 150 may not include a history tab for multiple sources since the history tab shows activities of a particular source.

FIG. 1O illustrates a user interface 120*o* that can be used to export search results. The user may export or create a report from the search results. The system may create a pop-up pane or window 180*o* for exporting the results. The user may specify the type of file, such as Word or Excel. The user may also specify whether to include all sources, starred sources, etc. Sources included in the export may be current sources in the source pane 140.

As explained above with respect to FIGS. 1A-1O, the system can provide a flexible way to explore resources and documents, events, other entities, and other relevant information related to these resources. For example, the system offers a resource-centric workflow, in addition to document searching. The system may also provide information about resources, such as distribution of resources across geographical areas and quality of resources, in a manner that is easy to understand and digestible. In this way, the system may support both a tactical workflow and a strategic workflow.

Figure 2:
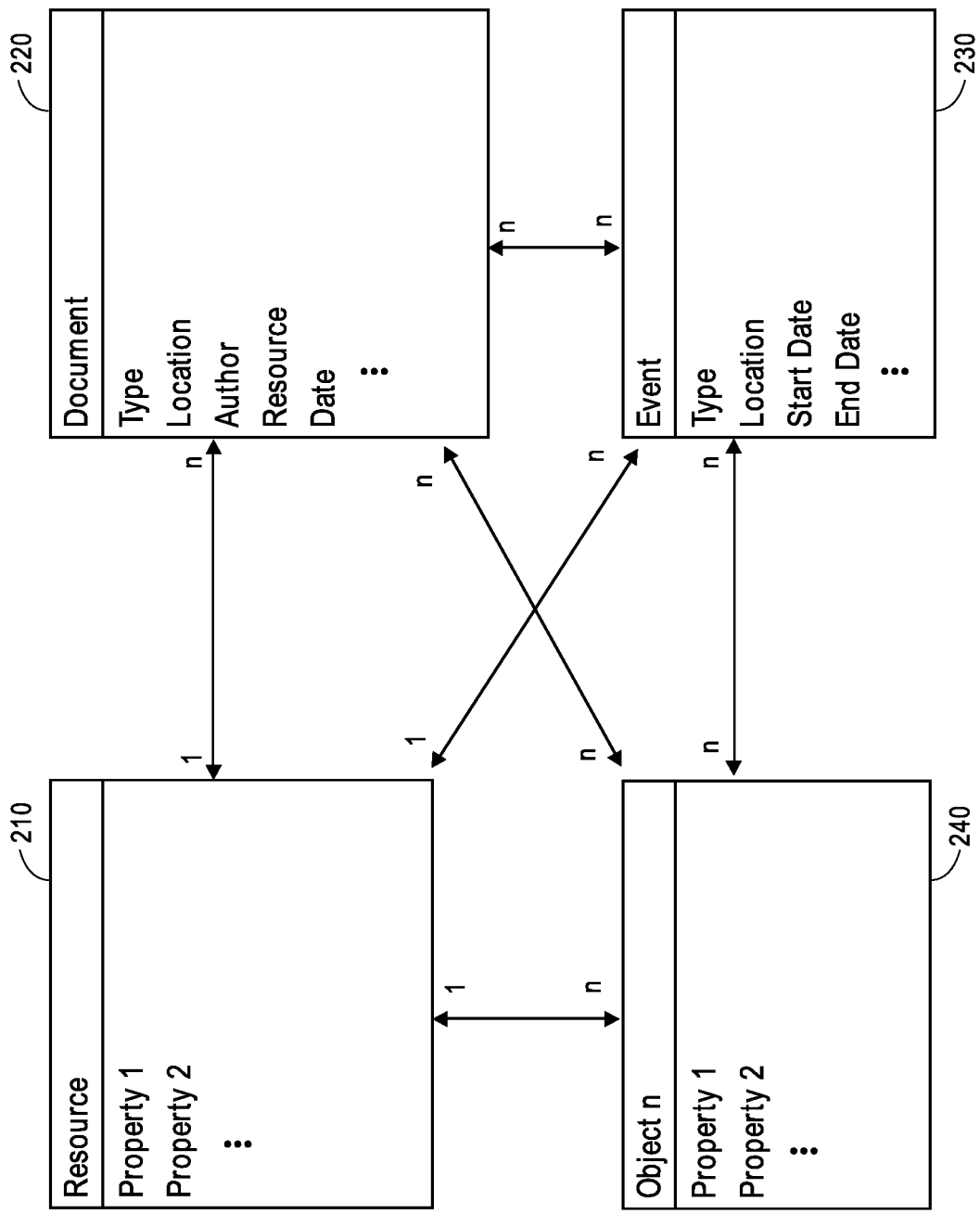
FIG. 2 illustrates data structures used by a search system for searching resources and related documents using data structures, according to certain embodiments.

FIG. 2 illustrates data structures used by a search system, according to certain embodiments. In certain embodiments, a resource, a document, and an event may be represented by respective types of data objects. For example, a resource is represented by a resource data object 210, a document is represented by a document data object 220, and an event is represented by an event data object 230. The system may also use other types of data object as appropriate, including for example entity data objects. In FIG. 2, another type of data object is represented as Object 240.

A resource may be associated with one or more documents, and vice versa, and the relationship between the resource data object 210 and the document data object 220 can be one-to-many, many-to-one, or many-to-many. A resource may also be associated with one or more events, and vice versa, and the relationship between the resource data object 210 and the event data object 230 can be one-to-many, many-to-one, or many-to-many. A resource may be also be associated with different types of data (for example, entities), and the relationship between the resource data object 210 and a particular type of data object representing such data (e.g., entity data objects or Object n 240) may be one-to-many, many-to-one, or many-to-many. The document data object 220 and the event data object 230 may also be associated with each other, and the relationship between the document data object 220 and the event data object 230 may be many-to-many, one-to-many, or many-to-one. The document data object 220 and the event data object 230 can also each be associated with another type of data object, and the relationship can be many-to-many, one-to-many, or many-to-one.

Each data object may have various properties associated with it. For instance, a document data object 220 can have properties such as the document type, location, author, resource, date, etc. An event data object 230 may have properties such as event type, location (e.g., city, country, etc.), start date, end date, etc. A resource data object 210 and other types of data objects 240 (e.g., an entity data object) each may also have various properties associated with them (e.g., represented as Property 1, Property 2, and so forth in FIG. 2). When resources are sources, the resource data object 210 can have properties such as source number or identifier, office, group, investigator, division, program, subprogram, status, gender, race, birthplace, language, religion, job title, skills, zip codes, etc. The data objects explained with connection to FIG. 2 may include different or other properties, depending on the embodiment. Attributes, characteristics, and/or information presented in the user interface of FIGS. 1A-1O may be linked to properties of one or more data objects.

The system may provide security settings and permissions. The security settings may be specified at various levels, e.g., at application-level, at object-level, at property level, etc. Security settings at different levels can be used in combination. For example, the resource data object 210 may have object-level security settings and also property-level security settings for individual properties. In the examples of FIGS. 1A-1O, the bar at the top indicates the security level for the application (e.g., "unclassified"). In the examples of FIGS. 1F, 1G, 1H, 1K, and 1M, the bar in the details pane 150 indicates the security level for a particular source or document (e.g., "unclassified"). The user interface 120 can also indicate the security level for each property, for example, as shown in FIGS. 1F, 1I, and 1J. By showing the security level information within the user interface, the system makes it easy for users to determine what information has normal security levels, higher security levels, etc.

The data may be accessible and viewable only to users who have permission. Permission may be specified for individuals, groups, etc. In some embodiments, the security settings are defined as private or public. In certain embodiments, the security settings are associated with classification of information. For example, only users having the right level of clearance may have access to certain properties, data objects, or applications. As explained above, "U" may refer to "unclassified," "S" may refer to "secret," and "TS" may refer to "top secret." The classification, access, or security scheme may be implemented based on an access control list (ACL) or similar system, as described above and in the various examples from documents incorporated by reference Certain details relating to data objects are provided below, for example, in connection with FIGS. 7-8.

Figure 3:
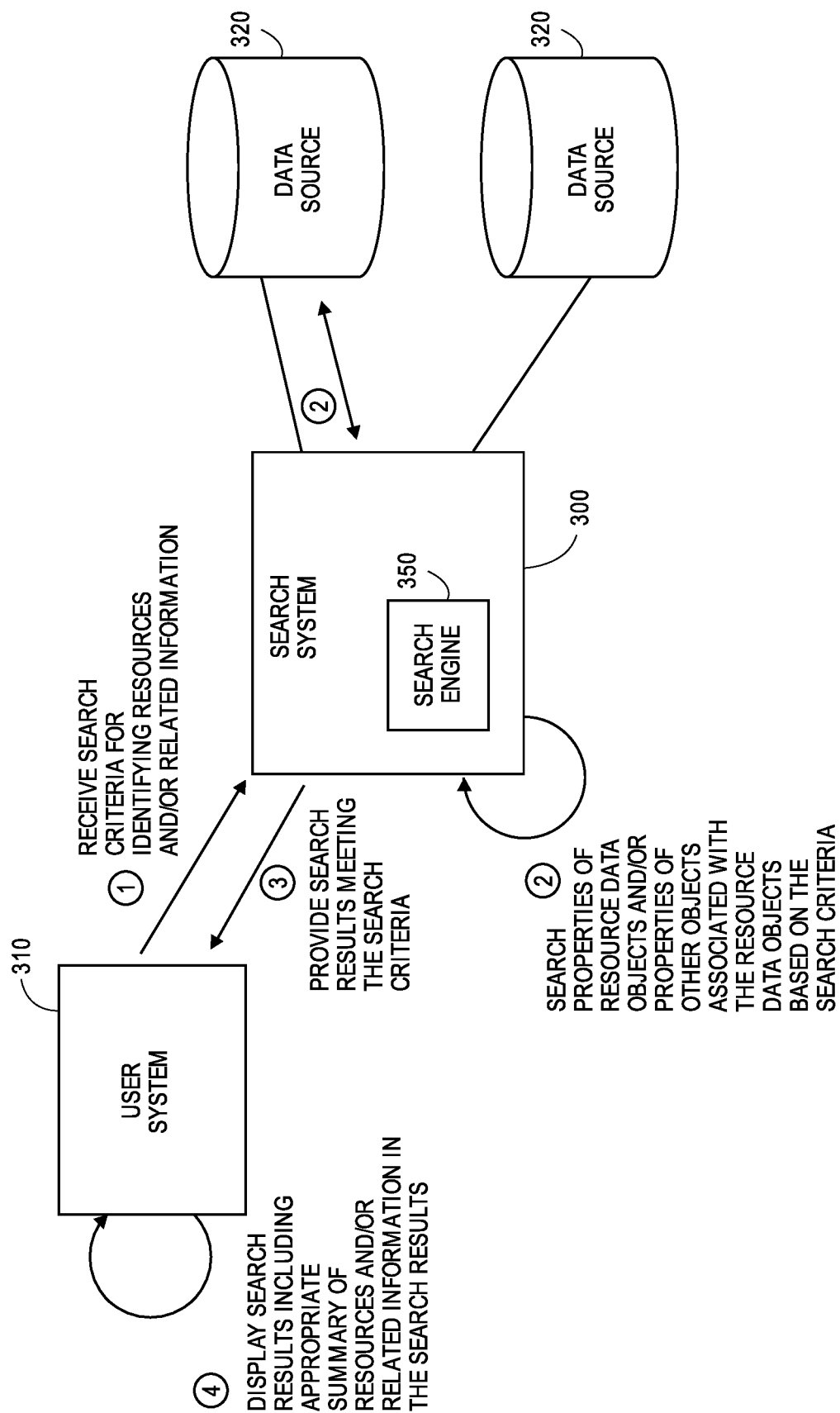
FIG. 3 is a data flow diagram illustrative of the interaction between the various components of a search system configured to search resources and related documents using data structures, according to one embodiment.

Searching for Resources and Related Documents, Events, or Other Entities or Objects using Data Structures FIG. 3 is a data flow diagram illustrative of the interaction between the various components of a search system 300 configured to search resources and related information (e.g., documents, events, other entities, or other objects) using data structures, according to one embodiment. Certain details relating to the system 300 are explained above, e.g., in connection with FIGS. 1-2. The system 300 may include a search engine 350 and may be connected to one or more data sources 320. The data sources 320 may include one or more databases. The system 300 can communicate with a user system 310. The search engine 350 may reside on a separate computing device from the system 300, depending on the embodiment.

At data flow action 1, the system 300 receives search criteria for identifying resources and/or related information (e.g., documents, events, entities, and/or other objects). Users can enter search criteria relating to any or multiple of those data types. As explained above, resources and related information (e.g., documents, events, entities, other objects, etc.) may be represented as respective types of data objects and can be stored in one or more databases or data sources. Certain search criteria may relate to properties of resource data objects, or properties of other data objects linked to the resource data objects. In some embodiments, the search criteria for resources may be based on the properties of data objects that are not resource data objects. In the example of FIG. 1A, the first field in the source section 112a is for birthplace, travel countries, and languages. Travel country can be a property of a travel event data object, which may be associated with a resource data object. When the system 300 receives the search criteria in the birthplace, travel countries, and languages field, the system 300 can search through the properties of the resource data objects for the birthplace and languages, search through the properties of the related travel event data objects for the travel country, and search through the properties of any other related data objects for relevant properties. The travel event data object can be similar to the event data object 230 in FIG. 2. The search can be more dynamic since properties of resource data objects, document objects, event data objects, entity data objects, or other associated objects can be used.

At data flow action 2, the system 300 searches properties of resource data objects and/or properties of other objects associated with the resource data objects based on the search criteria. If the user only entered search criteria relating to resources, the system 300 can identify resource data objects that meet the search criteria and return the identified resource data objects as well as document data objects, event data objects, entity data objects, or other data objects associated with the identified resource data objects. As explained above, search criteria relating to resources may be based on properties of other data objects linked to resource data objects, and the identified resource data objects can include resource data objects whose associated data objects have properties that meet some or all of the search criteria. If the user only entered search criteria relating to documents, the system 300 may identify document data objects that meet the search criteria and return the identified document data objects as well as resource data objects, event data objects, entity data objects, or other data objects associated with the identified document data objects. Similar to the resource data objects, search criteria relating to documents may also be based on properties of other data objects linked to document data objects, and the identified document data objects can include document data objects whose associated data objects have properties that meet some or all of the search criteria. In a similar fashion, searches centered around event data objects, entity data objects, or other data objects associated with resource data objects can be performed. If the user entered a combination of search criteria relating to resources and search criteria relating to other data objects (for example, documents, events, or entities), the system 300 can run the search for resource data objects with the search criteria relating to resources and run the search for other data objects with the search criteria relating to such other data objects, and return all resource data objects and such other data objects in the search results, e.g., as explained above.

The search engine 350 may provide various search-related functions, such as searching by faceting, indexing, etc. The data source(s) 320 can store information associated with the data objects. For example, the data sources 320 can include the database system 1010 as explained in connection with FIG. 7. In some implementations, the system may index data using systems and methods described in detail in U.S. patent application Ser. No. 14/837,951, titled "HORIZON LIVE REINDEX" filed Aug. 27, 2015, the entire disclosure of which is hereby made part of this specification as if set forth fully herein and incorporated by reference for all purposes, for all that it contains.

The data model or data objects may be organized in a particular way in order to optimize searches. For example, a resource data object 210 may include document data objects 220, and document data objects 220 also are associated with resource data objects 210. Similarly, a resource data object 210 may include event data objects 230, and event data objects 230 also are associated with resource data objects 210. Circular references may be eliminated among data objects in order to provide faster search results.

At data flow action 3, the system 300 provides the search results meeting the search criteria. As mentioned above, the search results can include resources, documents, events, entities, or other objects. Even in cases where the user only enters search criteria for documents, the system 300 may return the resources, events, entities, or other objects associated with the identified documents.

At data flow action 4, the user system 310 displays the search results including appropriate summary of resources and/or related information (e.g., documents, events, entities, and/or other objects) in the search results. The summary can relate to multiple resources or each individual resource, for example, as explained in connection with FIGS. 1A-1O. The user system 310 may generate a tiered user interface in which resources are displayed in one pane or section and details about the resources are displayed in another pane or section. The details can change based on the selected resource(s). As in FIGS. 1B-1O, the resources may be displayed in a first pane similar to the source pane 140, and the details about the resources (e.g., information about documents, etc.) can be displayed in a second pane similar to the details pane 150; the content of the second pane can change or update based on the information in the first pane. Depending on whether one resource is selected or multiple resources are selected in the first pane, the second pane can display information (e.g., summary) about a single resource or display aggregate information (e.g., summary) about multiple resources.

Although various aspects of searching are described using resources, documents, events, and entities, the search system described in this disclosure (e.g., the system 300) can accommodate any type of primary objects and related objects. The search can be focused on a primary object and be based on properties and/or characteristics of the primary object as well as linked objects of the primary object. The search system may accommodate any data organized around an object and its related information. All the user interfaces described above, for example, in connection with FIGS. 1A-1O, may also be adapted and configured for various types of data. For instance, the user interface 110a in FIG. 1A and the user interfaces 120 in FIGS. 1B-1O, including the different tabs in the details pane 150 in FIGS. 1B-1O, may be adapted for other types of data. The search system can be compatible with any type of search-analyze-export workflow.

Any of the data flow actions performed by the system 300 may be based on user input, may be automated, or may be based on a combination of user input and automation.

Searching for Resources and Related Documents using Histogram Filters

Figure 4:
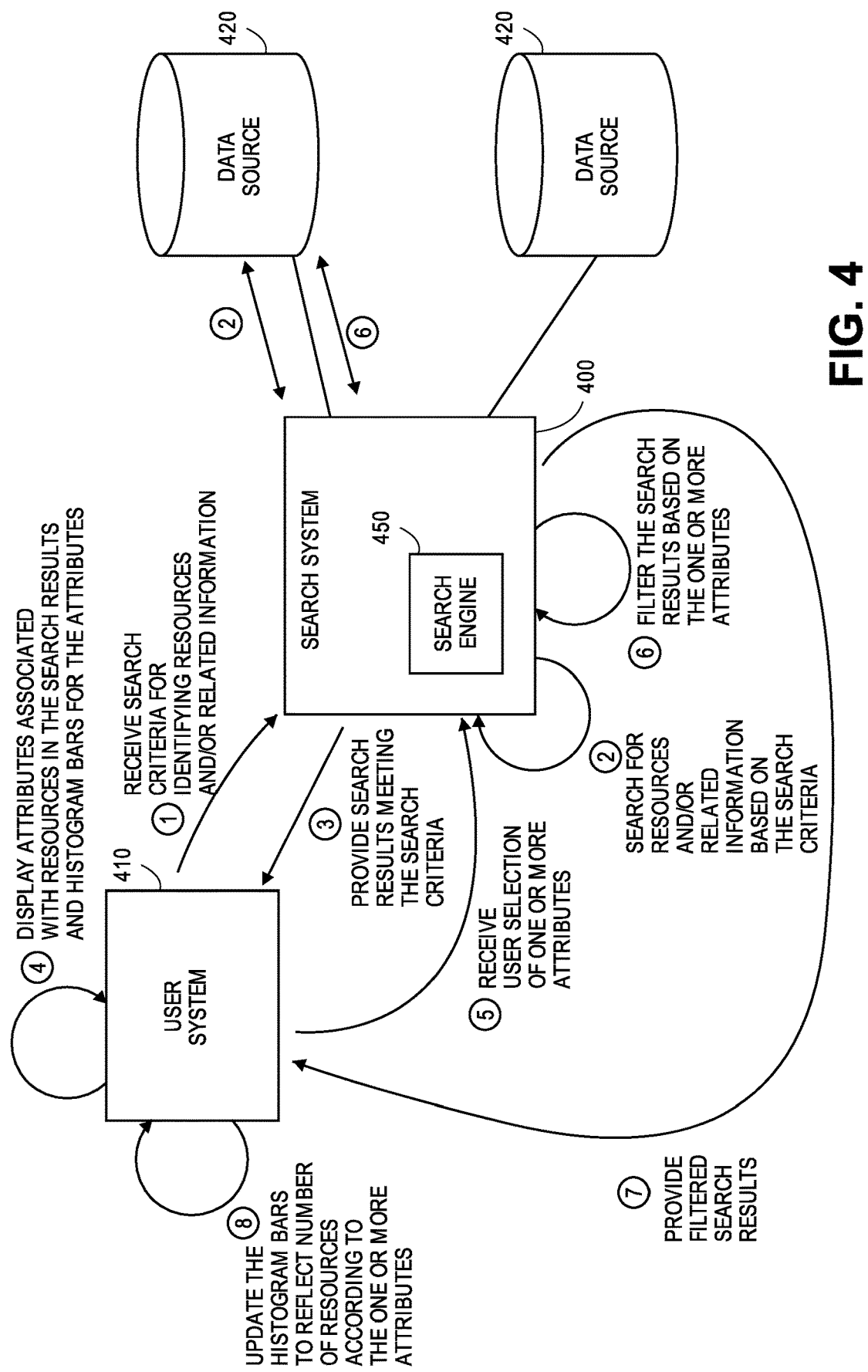
FIG. 4 is a data flow diagram illustrative of the interaction between the various components of a search system configured to search resources and related documents using a histogram filter(s), according to one embodiment.

FIG. 4 is a data flow diagram illustrative of the interaction between the various components of a search system 400 configured to search resources and/or related information (e.g., documents, events, entities, and/or other objects) using a histogram filter(s), according to one embodiment. The system 400 and corresponding components of FIG. 4 may be similar to or the same as the system 300 and similarly named components of FIG. 3. The system 400 may include additional or different components, depending on the embodiment. Certain details relating to the system 400 are explained above, e.g., in connection with FIGS. 1-3.

At data flow action 1, the system 400 receives search criteria for identifying resources, documents, events, entities, and/or other objects. Data flow action 1 may be similar to data flow action 1 of FIG. 3. At data flow action 2, the system 400 searches for resources, documents, events, entities, and/or other objects based on the search criteria. At data flow action 3, the system 400 provides the search results meeting the search criteria. Data flow action 3 may be similar to data flow action 3 of FIG. 3.

At data flow action 4, the user system 410 displays attributes associated with the resources in the search results and histogram bars for the attributes. For example, the user system 410 displays the attributes of the resources and corresponding histogram bars in the attributes pane 130 as explained in connection with FIGS. 1A-1O. The user system 410 may also display attributes of other data objects as appropriate. For instance, if certain search criteria is based on properties of linked data objects of the resource data object (e.g., travel countries), the properties related to the search criteria can also be shown in the attributes pane 130.

At data flow action 5, the system 400 receives user selection of one or more attributes. At data flow action 6, the system 400 filters the search results based on the one or more attributes. If user selects multiple attributes, the system 400 can recognize that multiple attributes have been selected and compute the changes to the user interface and refresh the user interface once for the selected attributes. Additionally, as described above in reference to FIG. 1E, the system may determine that all remaining search results have a given attribute, and may therefore disallow the user from deselecting that attribute (e.g., by greying out the attribute), thereby preventing the user from filtering down to zero results. As explained above, the user can opt-in for certain attributes, e.g., filter for data objects having the certain attributes. Also, the user can opt-out of certain attributes, e.g., filter for data objects not having certain attributes.

At data flow action 7, the system 400 provides filtered search results. At data flow action 8, the user system 410 updates the histogram bars to reflect the number of resources according to the one or more attributes.

In some embodiments, the user system 410 performs data flow actions 5-7, instead of the system 400. For instance, as explained below in connection with FIG. 5, the user system 410 may only receive identifiers (IDs) associated with the data objects and generate the user interface on the fly based on the IDs. The user system 410 may request further information used for generating the user interface (e.g., details for particular IDs) from the system 400 as needed.

Any of the data flow actions performed by the system 700 may be based on user input, may be automated, or may be based on a combination of user input and automation.

In some implementations, the system may generate histograms or other representations data groupings (e.g., any of the histograms or data representations described herein) in a distributed computing environment or by accessing multiple data sources. Examples of such methods of generating histograms or other representations are described in U.S. Pat. No. 8,433,702, titled "HORIZON HISTORGRAM OPTIMIZATIONS" filed Sep. 28, 2011, the entire disclosure of which is hereby made part of this specification as if set forth fully herein and incorporated by reference for all purposes, for all that it contains.

Saving and Sharing Searches for Resources and Related Documents

Figure 5:
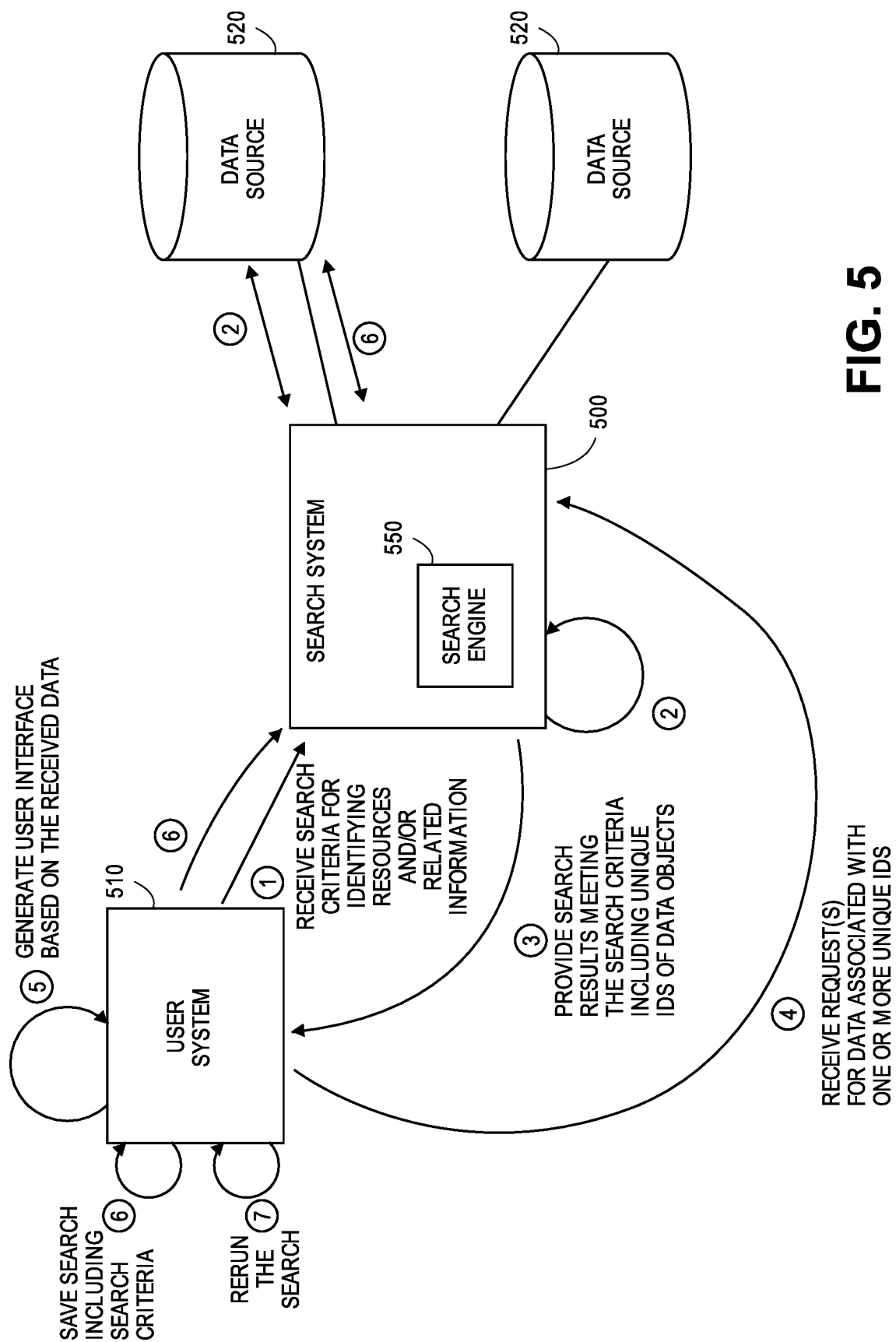
FIG. 5 is a data flow diagram illustrative of the interaction between the various components of a search system configured to search resources and related documents using a saved or shared search, according to one embodiment.

FIG. 5 is a data flow diagram illustrative of the interaction between the various components of a search system configured to search resources and related documents using a saved or shared search, according to one embodiment. The system 500 and corresponding components of FIG. 5 may be similar to or the same as the system 300, 400 and similarly named components of FIGS. 3 and 4. The system 500 may include additional or different components, depending on the embodiment. Certain details relating to the system 500 are explained above, e.g., in connection with FIGS. 1-4. Some details relating to the system 300, 400, and 500 in FIGS. 3-5 are explained below, e.g., in connection with FIGS. 7-9.

At data flow action 1, the system 500 receives search criteria for identifying resources and/or related information (e.g., documents, events, entities, and/or other objects). Data flow action 1 may be similar to data flow action 1 of FIGS. 3 and 4. At data flow action 2, the system 500 searches properties of resource data objects and/or properties of other objects associated with the resource data objects based on the search criteria. Data flow action 2 may be similar to data flow action 2 of FIG. 3.

At data flow action 3, the system 500 provides search results meeting the search criteria including unique IDs of data objects. The search results can include unique IDs of resource data objects and/or unique IDs of related document, event, entity, or other data objects. The user system 510 may generate a user interface to display the results based on the unique IDs in the search results. In order to reduce the amount of state information stored at the system 500 (e.g., web server), the system 500 and the user system 510 may send and receive the IDs of the relevant data objects, and corresponding details can be obtained in subsequent requests. In certain embodiments, the initial search results may include information to be displayed in the attributes pane 130 (e.g., a list of attributes associated with the IDs and corresponding count) as well as the list of IDs for resources, documents, events, entities, and other objects. In some cases, the user system 510 can first receive a list of attributes associated with the IDs in the initial search results and then request the number of data objects having each attribute in subsequent requests. Or the user system 510 may request both the list of attributes associated with the IDs and the number of data objects having each attribute after receiving the initial search results.

At data flow action 4, the system 500 receives request(s) for data associated with one or more unique IDs. If the user system 510 needs details for particular ID(s), the user system 510 can send one or more request(s) to the system 500 for the details. The system 500 can return the appropriate information to the user system 510, and the user system 510 can use the details in generating the user interface. In one example, if the user selects a particular resource, the user system 510 requests the details for the selected resource to the system 500, and the system 500 returns the details.

At data flow action 5, the user system 510 generates a user interface based on the received data. As explained above, the user system 510 can compute and generate the user interface on the fly based on the search results. The user may filter the initial search results by selecting or excluding attributes from the attributes pane 130. The user system 510 can request the system 500 for updated search results. The user system 510 can also request the system 500 for the updated count for the attributes in order to compute the histogram bars. When any changes or updates occur within the user interface that triggers an update to the search, the user system 510 or the system 500 can determine what other data within the user interface should be updated. In certain embodiments, the user system 510 or the system 500 determines the dependencies between different parts of an application and figures out the order of changes as well as the minimum amount of changes that should be made to update (e.g., avoid repeating same or similar operations, etc.).

Using the IDs of data objects in the search results can reduce the amount of data that is stored on the system 500 for a particular search. For example, the web server can only store the IDs and obtain further information from the data sources 520 as needed. For example, in response to an initial search the search system 500 may obtain results as a list of matching object IDs. Then the matching object IDs may be used by the search system to obtain information needed to render information such as histograms, keywords tab, etc. This information may then be provided to the user system 510 for rendering. When the user provides an input, e.g., clicking a histogram checkbox, the search system 500 may then filter to the subset of object IDs still matching from the original search, and recompute all the UI elements (e.g., histograms, etc.). In this manner, the system 500 can provide scalability since the web server would not need to store a lot of information for a search, and in certain implementations may maintain an initial list of matching object ids than may be further filtered very efficiently, and may thereby be able to handle a large number of concurrent search requests without crashing.

At data flow action 6, the user system 510 saves the search including the search criteria. For example, a link to the search is created on the Desktop of the user's computer. The user may also share the search, for example, by email or through a link. When the user saves or shares the search, the system 500 may create a unique ID for the search, create a permanent link (e.g., permalink) to access the search, and save relevant information (e.g., state information) in the data sources 520. The system 500 may also save information specific to the user, such as the starred resources. When the search is accessed at a later time by the user or another user, the system 500 can return results that meet the search criteria at that time. Therefore, the users can view the up-to-date search results for the same search criteria. In some embodiments, the user may not make changes to a shared search, but may create or share a new search based on the shared search. The system 500 can create a new unique ID for the new search and save the information in the data sources 520. The new search may also be shared. Users may make changes to their own saved searches.

At data flow action 7, the user system 510 reruns the search. When the user accesses the link to the saved or shared search, the user system 510 requests the search to the system 500, and the system 500 can provide the up-to-date results for the search, as explained above.

Any of the data flow actions performed by the system 500 may be based on user input, may be automated, or may be based on a combination of user input and automation.

Figure 6:
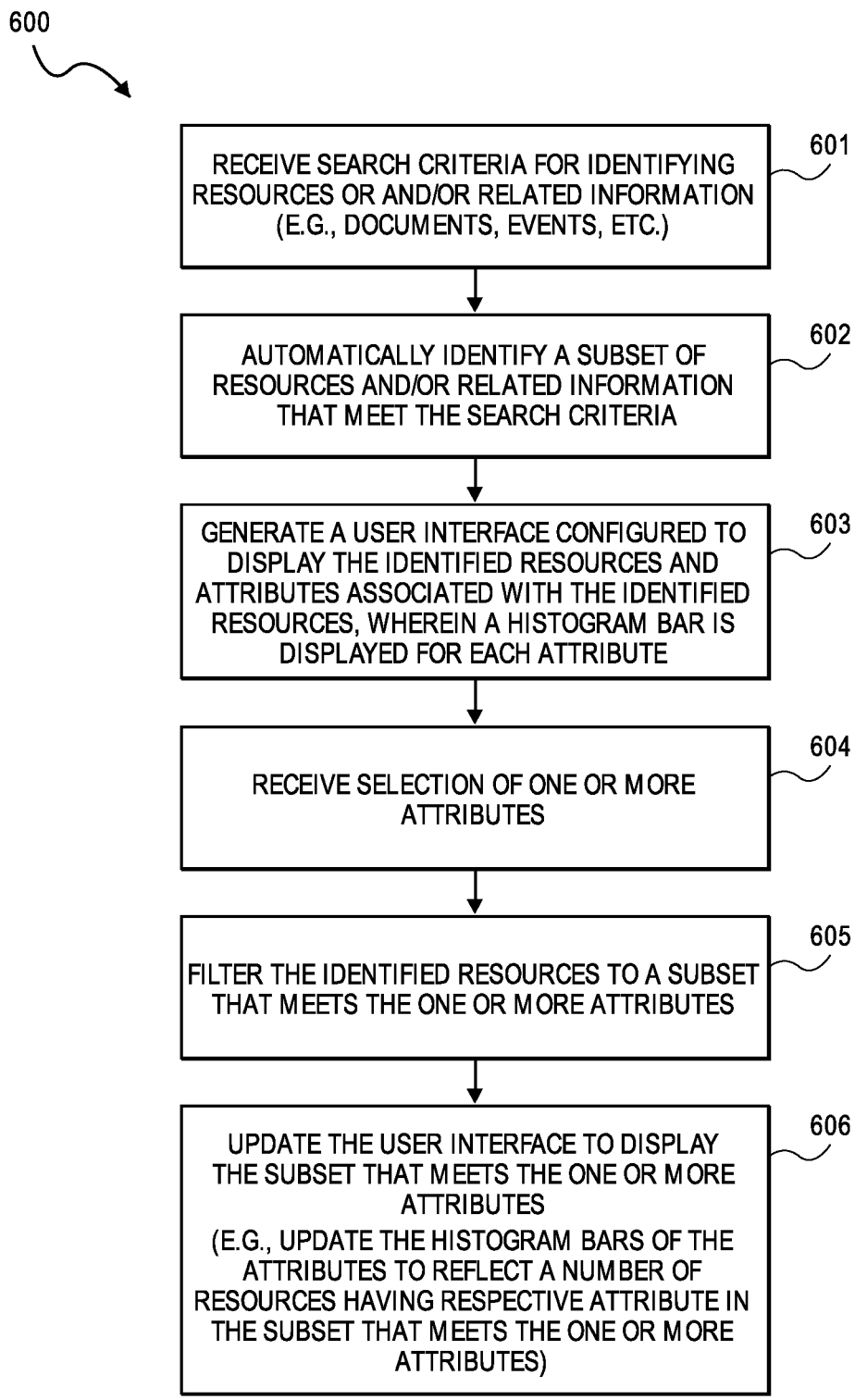
FIG. 6 illustrates a flowchart for searching resources and related documents using data structures, according to certain embodiments.

FIG. 6 illustrates a flowchart for searching resources and/or related information (e.g., documents, events, entities, and/or other objects) using data structures, according to certain embodiments. The process 600 may be implemented by one or more systems described with respect to FIGS. 3-5. For illustrative purposes, the process 600 is explained below in connection with the system 300 in FIG. 3. Certain details relating to the process 600 are explained in more detail with respect to FIGS. 1-5. Depending on the embodiment, the process 600 may include fewer or additional blocks, and the blocks may be performed in an order that is different than illustrated.

At block 601, the system 300 receives search criteria for identifying resources associated with an organization and/or related information (e.g., documents, events, entities and/or other objects). The search criteria may relate to the resources, documents, events, entities, or other objects. For example, the search criteria may include one or more of: first search criteria relating to the resources, second search criteria relating to the documents, third search criteria relating to the events, fourth search criteria relating to the entities, and other search criteria relating to other objects. Some of the first search criteria relating to the resources may be based on the properties of other data objects associated with the resources. The resources, documents, events, entities, and other objects may be represented as respective data objects. Resource, document, event, entity, and other data objects can be associated with each other.

At block 602, the system 300 automatically identifies subsets of the resources and/or related information (e.g., documents, events, entities, and/or other objects) that meet the search criteria. The identified resources may meet the search criteria or may be associated with the identified documents, events, entities, or other objects that meet the search criteria. The identification of the subsets of the resources, documents, events, entities, or other objects can be based on one or more of: properties of the resources, properties of the documents, properties of the events, properties of the entities, or properties of other data objects associated with the resources. Similar to the identified resources, the identified documents, events, entities, or other objects can meet the search criteria or can be associated with the identified resources that meet the search criteria. In one embodiment, the identified resources include one or more of: resources that meet the first search criteria relating to the resources, resources that are associated with documents that meet the second search criteria relating to the documents, resources that are associated with events that meet the third search criteria relating to the events, resources that are associated with entities that meet the fourth search criteria relating to entities, and resources that are associated with other data objects that meet other search criteria relating to such data objects. In another embodiment, the identified documents include one or more of: documents that meet the second search criteria relating the documents, or documents that are associated with resources that meet the first search criteria relating to the resources, documents that are associated with events that meet the third search criteria relating to the events, documents that are associated with entities that meet the fourth search criteria relating to entities, and documents that are associated with other data objects that meet other search criteria relating to such data objects. Similarly, other embodiments can identify data objects including one or more of such data objects that meet the search criteria relating to such data object or other related data objects.

At block 603, the system 300 generates a user interface configured to display the identified resources and attributes associated with the identified resources. The attributes can correspond to some or all of the properties of the identified resources. In some embodiments, at least some of the attributes can correspond to the properties of the other data objects associated with the resources. The user interface can display an aggregate summary relating to the identified resources and documents, events, entities, and other objects associated with the identified resources. A histogram bar may be displayed in the user interface for each attribute. The histogram bar can reflect the number of the identified resources having the attribute.

In certain embodiments, the user interface includes a first pane for displaying the identified resources and a second pane for displaying information associated with one or more selected resources of the identified resources. If one or more resources of the identified resources are selected in the first pane, one or more documents, events, entities, or other objects associated with the one or more selected resources may be displayed in the second pane. For example, the one or more documents, events, entities, or other objects displayed in the second pane can meet the search criteria.

At block 604, the system 300 receives selection of one or more attributes. At block 605, the system 300 filters the identified resources to a subset that meets the one or more attributes. This may be referred to as "opting in" for the selected attributes.

At block 606, the system 300 updates the user interface to display the subset that meets the one or more attributes. For example, updating the user interface may include updating the histogram bars of the attributes to reflect the number of resources having respective attribute in the subset that meets the one or more attributes. In some embodiments, the system 300 receives exclusion of second one or more attributes, or an indication of the exclusion. The system 300 filters the identified resources to a second subset that does not meet the second one or more attributes. The system 300 updates the user interface to display the second subset. The system 300 also updates the histogram bars of the attributes to reflect the number of resources having respective attribute in the second subset. This may be referred to as "opting out" of the excluded attributes.

In certain embodiments, the user system 310 performs all or some of blocks 601-607, instead of the system 300. For example, as described in connection with FIGS. 4-5, the user system 310 generates the user interface, filters the identified resources to the subset that meets the one or more attributes, updates the user interface, updates the histogram bars of the attributes, etc.

Additional Definitions

In order to facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide exemplary definitions.

Ontology: Stored information that provides a data model for storage of data in one or more databases. For example, the stored data may comprise definitions for object types and property types for data in a database, and how objects and properties may be related.

Database: A broad term for any data structure for storing and/or organizing data, including, but not limited to, relational databases (Oracle database, mySQL database, etc.), non-relational databases (for example, a NoSQL database), an in-memory database, spreadsheets, XML files, and text file, among others. The various terms "database," "storage," "data store," and "data source" may be used interchangeably in the present disclosure.

Data Object or Object: A data container for information representing specific things in the world that have a number of definable properties. For example, a data object can represent an entity such as a person, a place, an organization, a market instrument, or other noun. A data object can represent an event that happens at a point in time or for a duration. A data object can represent a document or other unstructured data source such as an e-mail message, a news report, or a written paper or article. Each data object may be associated with a unique identifier that uniquely identifies the data object. The object's attributes (e.g. metadata about the object) may be represented in one or more properties.

Object Type: Type of a data object (e.g., Person, Event, or Document). Object types may be defined by an ontology and may be modified or updated to include additional object types. An object definition (e.g., in an ontology) may include how the object is related to other objects, such as being a sub-object type of another object type (e.g. an investigator may be a sub-object type of a person object type), and the properties the object type may have.

Properties: Attributes of a data object that represent individual data items. At a minimum, each property of a data object has a property type and a value or values.

Property Type: The type of data a property is, such as a string, an integer, or a double. Property types may include complex property types, such as a series data values associated with timed ticks (e.g. a time series), etc.

Property Value: The value associated with a property, which is of the type indicated in the property type associated with the property. A property may have multiple values.

Link: A connection between two data objects, based on, for example, a relationship, an event, and/or matching properties. Links may be directional, such as one representing a payment from person A to B, or bidirectional.

Link Set: Set of multiple links that are shared between two or more data objects.

Object Centric Data Model

To provide a framework for the discussion of specific systems and methods described herein, an example database system 1010 using an ontology 1005 will now be described. This description is provided for the purpose of providing an example and is not intended to limit the techniques to the example data model, the example database system, or the example database system's use of an ontology to represent information.

In one embodiment, a body of data is conceptually structured according to an object-centric data model represented by ontology 1005. The conceptual data model is independent of any particular database used for durably storing one or more database(s) 1009 based on the ontology 1005. For example, each object of the conceptual data model may correspond to one or more rows in a relational database or an entry in Lightweight Directory Access Protocol (LDAP) database, or any combination of one or more databases.

Figure 7:
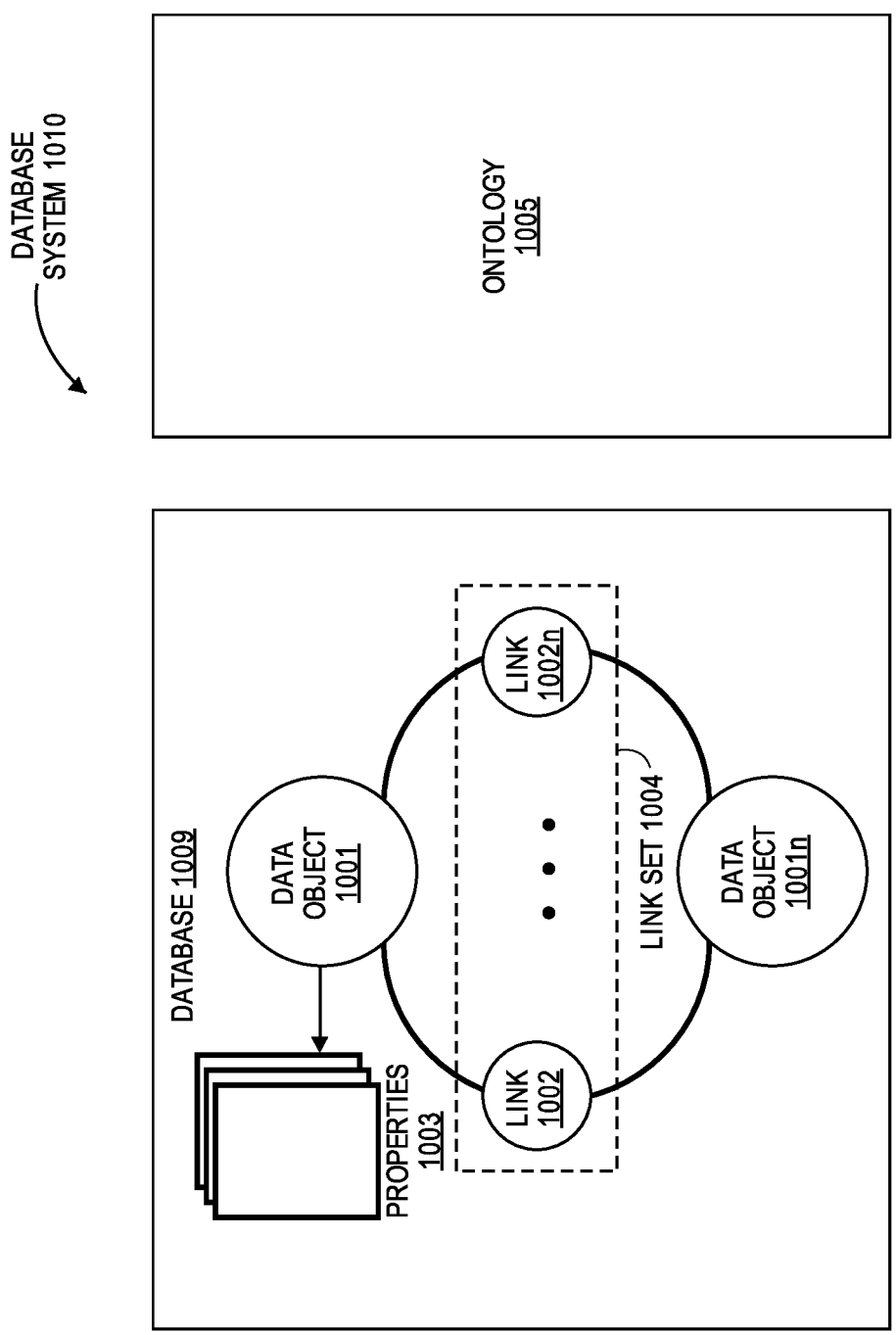
FIG. 7 illustrates one embodiment of a database system using an ontology.

FIG. 7 illustrates an object-centric conceptual data model according to an embodiment. An ontology 1005, as noted above, may include stored information providing a data model for storage of data in the database 1009. The ontology 1005 may be defined by one or more object types, which may each be associated with one or more property types. At the highest level of abstraction, data object 1001 is a container for information representing things in the world. For example, data object 1001 can represent an entity such as a person, a place, an organization, a market instrument, or other noun. Data object 1001 can represent an event that happens at a point in time or for a duration. Data object 1001 can represent a document or other unstructured data source such as an e-mail message, a news report, or a written paper or article. Each data object 1001 is associated with a unique identifier that uniquely identifies the data object within the database system.

Different types of data objects may have different property types. For example, a "Person" data object might have an "Eye Color" property type and an "Event" data object might have a "Date" property type. Each property 1003 as represented by data in the database system 1010 may have a property type defined by the ontology 1005 used by the database 1005.

Objects may be instantiated in the database 1009 in accordance with the corresponding object definition for the particular object in the ontology 1005. For example, a specific monetary payment (e.g., an object of type "event") of US$30.00 (e.g., a property of type "currency") taking place on Mar. 27, 2009 (e.g., a property of type "date") may be stored in the database 1009 as an event object with associated currency and date properties as defined within the ontology 1005.

The data objects defined in the ontology 1005 may support property multiplicity. In particular, a data object 1001 may be allowed to have more than one property 1003 of the same property type. For example, a "Person" data object might have multiple "Address" properties or multiple "Name" properties.

Each link 1002 represents a connection between two data objects 1001. In one embodiment, the connection is either through a relationship, an event, or through matching properties. A relationship connection may be asymmetrical or symmetrical. For example, "Person" data object A may be connected to "Person" data object B by a "Child Of" relationship (where "Person" data object B has an asymmetric "Parent Of" relationship to "Person" data object A), a "Kin Of" symmetric relationship to "Person" data object C, and an asymmetric "Member Of" relationship to "Organization" data object X. The type of relationship between two data objects may vary depending on the types of the data objects. For example, "Person" data object A may have an "Appears In" relationship with "Document" data object Y or have a "Participate In" relationship with "Event" data object E. As an example of an event connection, two "Person" data objects may be connected by an "Airline Flight" data object representing a particular airline flight if they traveled together on that flight, or by a "Meeting" data object representing a particular meeting if they both attended that meeting. In one embodiment, when two data objects are connected by an event, they are also connected by relationships, in which each data object has a specific relationship to the event, such as, for example, an "Appears In" relationship.

As an example of a matching properties connection, two "Person" data objects representing a brother and a sister, may both have an "Address" property that indicates where they live. If the brother and the sister live in the same home, then their "Address" properties likely contain similar, if not identical property values. In one embodiment, a link between two data objects may be established based on similar or matching properties (e.g., property types and/or property values) of the data objects. These are just some examples of the types of connections that may be represented by a link and other types of connections may be represented; embodiments are not limited to any particular types of connections between data objects. For example, a document might contain references to two different objects. For example, a document may contain a reference to a payment (one object), and a person (a second object). A link between these two objects may represent a connection between these two entities through their co-occurrence within the same document.

Each data object 1001 can have multiple links with another data object 1001 to form a link set 1004. For example, two "Person" data objects representing a husband and a wife could be linked through a "Spouse Of" relationship, a matching "Address" property, and one or more matching "Event" properties (e.g., a wedding). Each link 1002 as represented by data in a database may have a link type defined by the database ontology used by the database.

Figure 8:
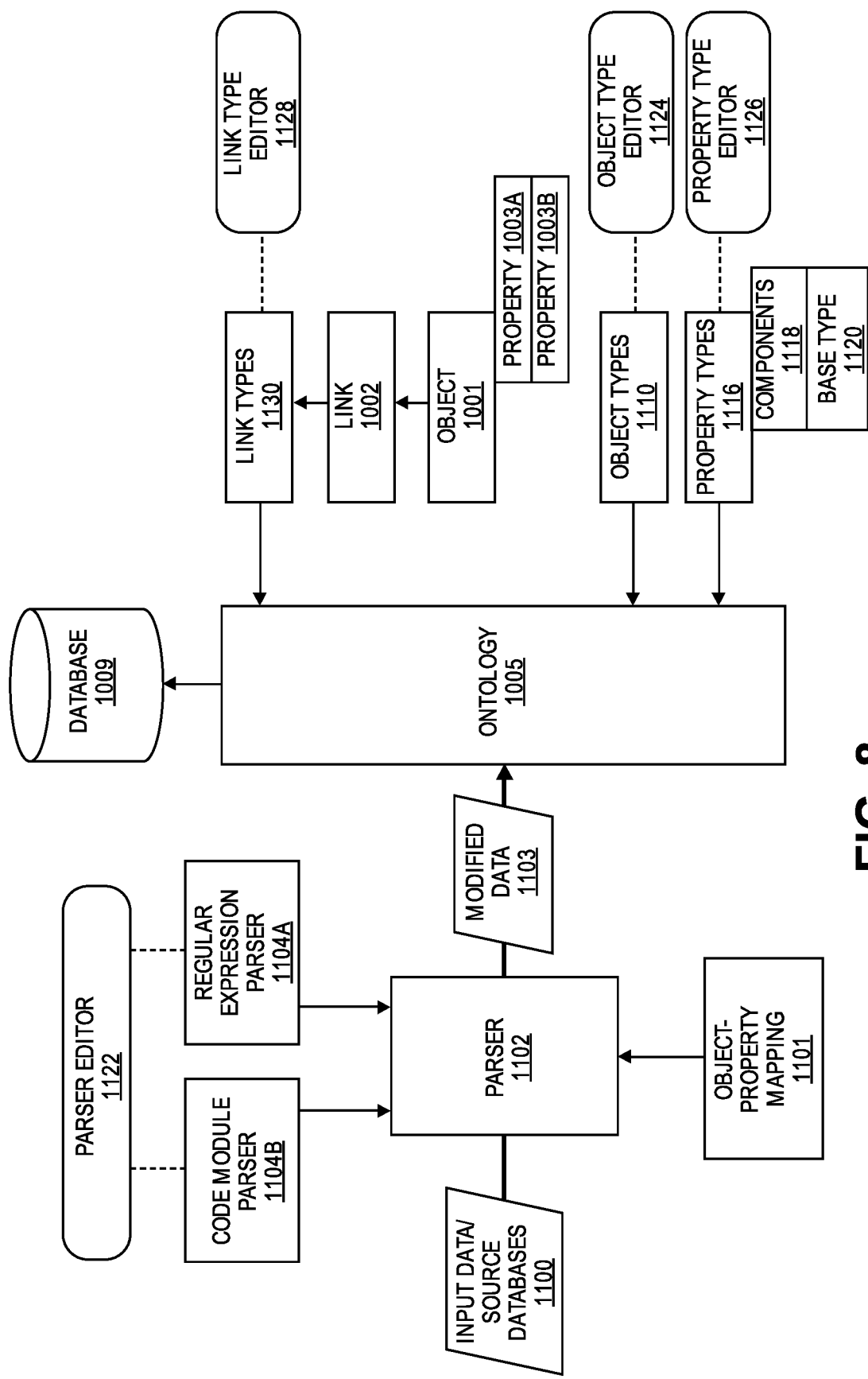
FIG. 8 illustrates one embodiment of a system for creating data in a data store using a dynamic ontology.

FIG. 8 is a block diagram illustrating exemplary components and data that may be used in identifying and storing data according to an ontology. In this example, the ontology may be configured, and data in the data model populated, by a system of parsers and ontology configuration tools. In the embodiment of FIG. 8, input data 1100 is provided to parser 1102. The input data may comprise data from one or more sources. For example, an institution may have one or more databases with information on credit card transactions, rental cars, and people. The databases may contain a variety of related information and attributes about each type of data, such as a "date" for a credit card transaction, an address for a person, and a date for when a rental car is rented. The parser 1102 is able to read a variety of source input data types and determine which type of data it is reading.

In accordance with the discussion above, the example ontology 1005 comprises stored information providing the data model of data stored in database 1009, and the ontology is defined by one or more object types 1110, one or more property types 1116, and one or more link types 1130. Based on information determined by the parser 1102 or other mapping of source input information to object type, one or more data objects 1001 may be instantiated in the database 1009 based on respective determined object types 1110, and each of the objects 1001 has one or more properties 1003 that are instantiated based on property types 1116. Two data objects 1001 may be connected by one or more links 1002 that may be instantiated based on link types 1130. The property types 1116 each may comprise one or more data types 1118, such as a string, number, etc. Property types 1116 may be instantiated based on a base property type 1120. For example, a base property type 1120 may be "Locations" and a property type 1116 may be "Home."

In an embodiment, a user of the system uses an object type editor 1124 to create and/or modify the object types 1110 and define attributes of the object types. In an embodiment, a user of the system uses a property type editor 1126 to create and/or modify the property types 1116 and define attributes of the property types. In an embodiment, a user of the system uses link type editor 1128 to create the link types 1130. Alternatively, other programs, processes, or programmatic controls may be used to create link types and property types and define attributes, and using editors is not required.

In an embodiment, creating a property type 1116 using the property type editor 1126 involves defining at least one parser definition using a parser editor 1122. A parser definition comprises metadata that informs parser 1102 how to parse input data 1100 to determine whether values in the input data can be assigned to the property type 1116 that is associated with the parser definition. In an embodiment, each parser definition may comprise a regular expression parser 1104A or a code module parser 1104B. In other embodiments, other kinds of parser definitions may be provided using scripts or other programmatic elements. Once defined, both a regular expression parser 1104A and a code module parser 1104B can provide input to parser 1102 to control parsing of input data 1100.

Using the data types defined in the ontology, input data 1100 may be parsed by the parser 1102 determine which object type 1110 should receive data from a record created from the input data, and which property types 1116 should be assigned to data from individual field values in the input data. Based on the object-property mapping 1101, the parser 1102 selects one of the parser definitions that is associated with a property type in the input data. The parser parses an input data field using the selected parser definition, resulting in creating new or modified data 1103. The new or modified data 1103 is added to the database 1009 according to ontology 1005 by storing values of the new or modified data in a property of the specified property type. As a result, input data 1100 having varying format or syntax can be created in database 1009. The ontology 1005 may be modified at any time using object type editor 1124, property type editor 1126, and link type editor 1128, or under program control without human use of an editor. Parser editor 1122 enables creating multiple parser definitions that can successfully parse input data 1100 having varying format or syntax and determine which property types should be used to transform input data 1100 into new or modified input data 1103.

Implementation Mechanisms

According to one embodiment, the techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 10:
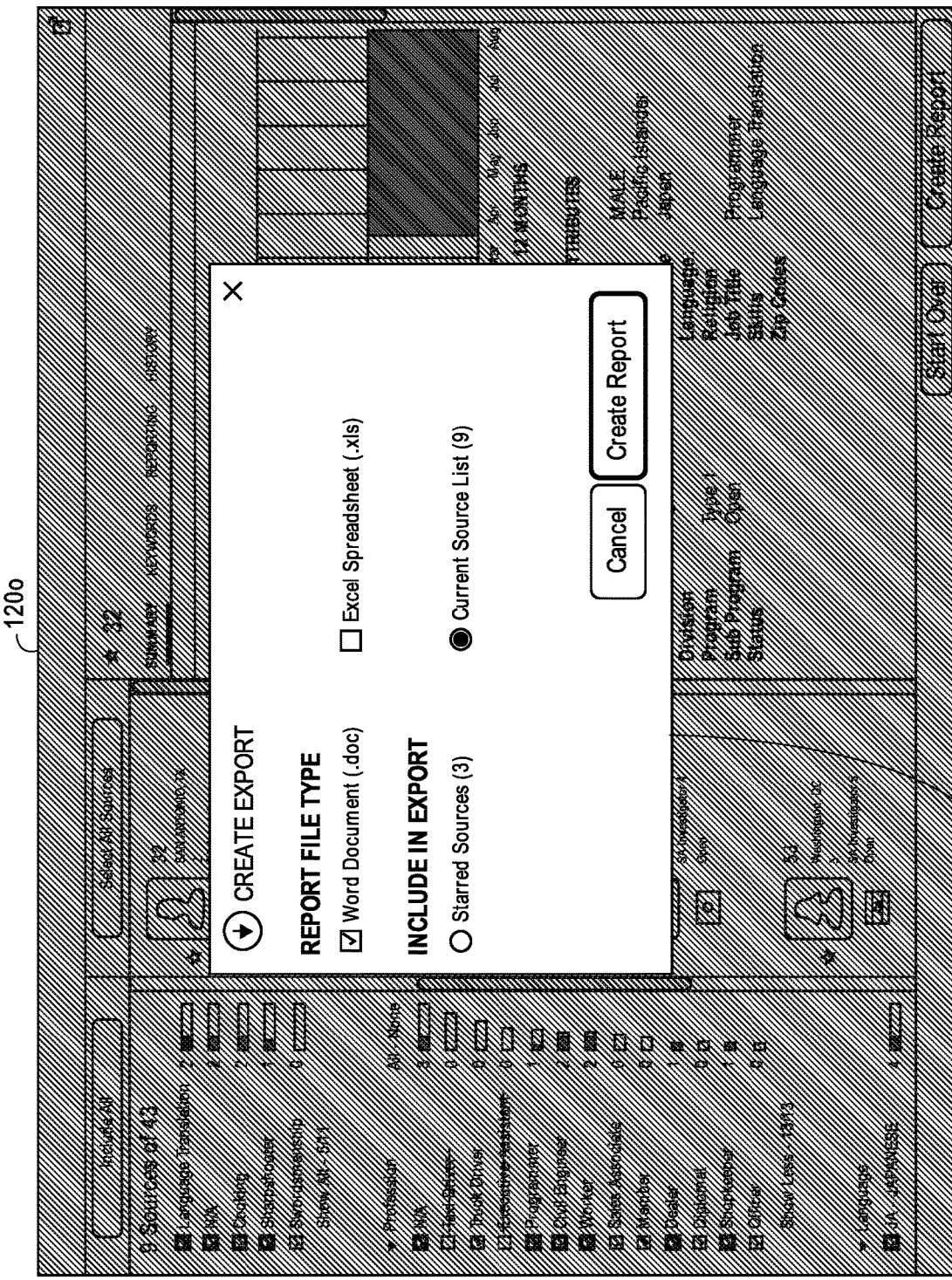
Figure 9:
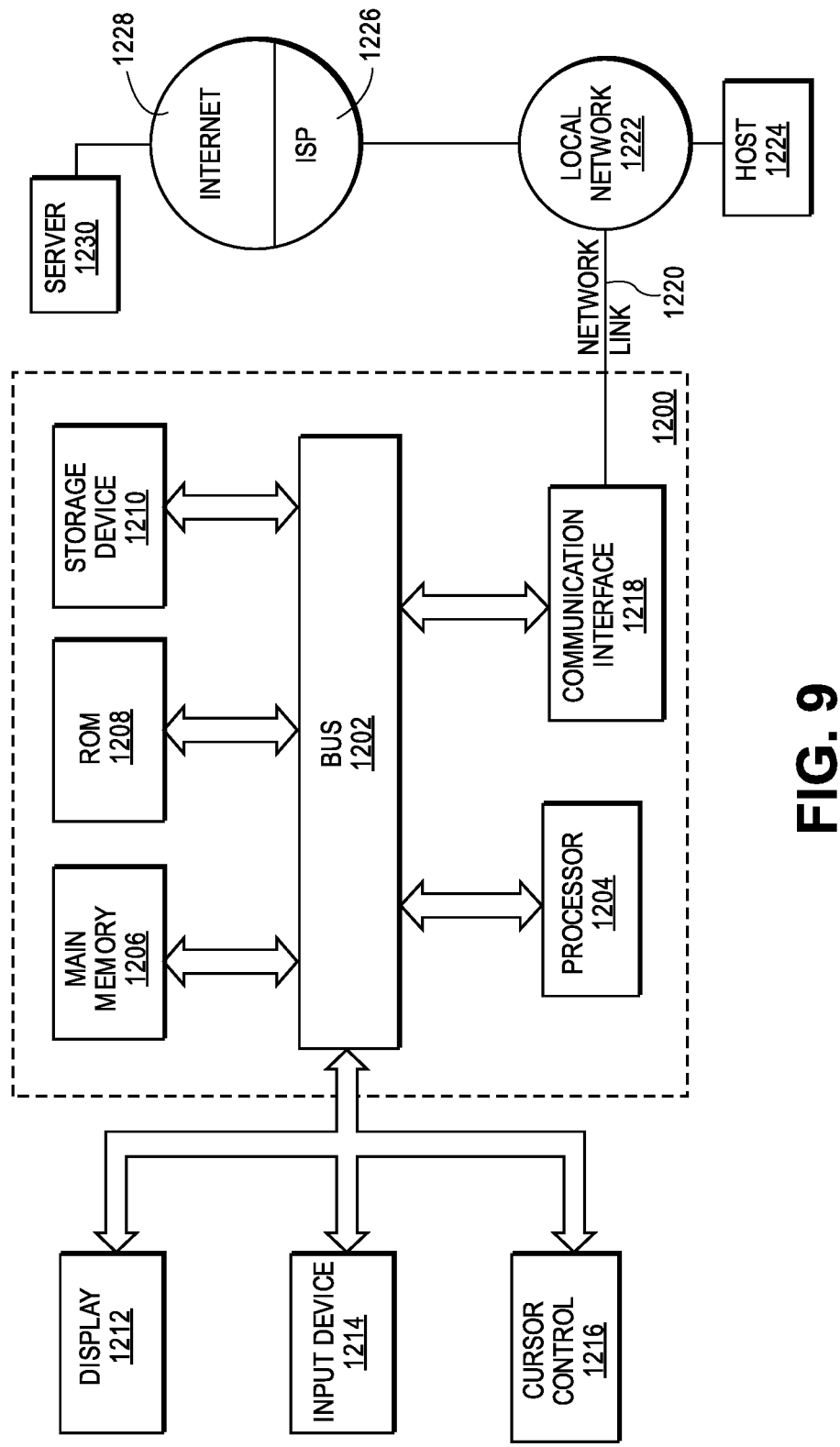
FIG. 9 illustrates a computer system with which certain methods discussed herein may be implemented.

For example, FIG. 9 shows a block diagram that illustrates a computer system 1200 upon which an embodiment may be implemented. For example, the computing system 1200 may comprise a system for searching for resources and related documents using data structures. Other computing systems discussed herein may include any portion of the circuitry and/or functionality discussed with reference to system 1200. For instance, the system 300, 400, and/or 500 can each include some or all of the components and/or functionality of the system 1200. The system 300, 400, and/or 500 may also each include some or all of the components and/or functionality of components (or systems) described in FIGS. 10-11 (e.g., the database system 1010).

Computer system 1200 includes a bus 1202 or other communication mechanism for communicating information, and a hardware processor, or multiple processors, 1204 coupled with bus 1202 for processing information. Hardware processor(s) 1204 may be, for example, one or more general purpose microprocessors.

Computer system 1200 also includes a main memory 1206, such as a random access memory (RAM), cache and/or other dynamic storage devices, coupled to bus 1202 for storing information and instructions to be executed by processor 1204. Main memory 1206 also may be used for storing temporary variables or other intermediate information during execution of instructions to be executed by processor 1204. Such instructions, when stored in storage media accessible to processor 1204, render computer system 1200 into a special-purpose machine that is customized to perform the operations specified in the instructions.

Computer system 1200 further includes a read only memory (ROM) 1208 or other static storage device coupled to bus 1202 for storing static information and instructions for processor 1204. A storage device 1210, such as a magnetic disk, optical disk, or USB thumb drive (Flash drive), etc., is provided and coupled to bus 1202 for storing information and instructions.

Computer system 1200 may be coupled via bus 1202 to a display 1212, such as a cathode ray tube (CRT) or LCD display (or touch screen), for displaying information to a computer user. An input device 1214, including alphanumeric and other keys, is coupled to bus 1202 for communicating information and command selections to processor 1204. Another type of user input device is cursor control 1216, such as a mouse, a trackball, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 1200 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage Computer system 1200 may implement the techniques described herein using customized hard-wired logic, one or more ASICs or FPGAs, firmware and/or program logic which in combination with the computer system causes or programs computer system 1200 to be a special-purpose machine. According to one embodiment, the techniques herein are performed by computer system 1200 in response to processor(s) 1204 executing one or more sequences of one or more instructions contained in main memory 1206. Such instructions may be read into main memory 1206 from another storage medium, such as storage device 1210. Execution of the sequences of instructions contained in main memory 1206 causes processor(s) 1204 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1210. Volatile media includes dynamic memory, such as main memory 1206. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between nontransitory media. For example, transmission media includes coaxial cables, copper wire and fiber optics, including the wires that comprise bus 1202. Transmission media can also take the form of acoustic or light waves, such as those generated during radio-wave and infra-red data communications.

Various forms of media may be involved in carrying one or more sequences of one or more instructions to processor 1204 for execution. For example, the instructions may initially be carried on a magnetic disk or solid state drive of a remote computer. The remote computer can load the instructions into its dynamic memory and send the instructions over a telephone line using a modem. A modem local to computer system 1200 can receive the data on the telephone line and use an infra-red transmitter to convert the data to an infra-red signal. An infra-red detector can receive the data carried in the infra-red signal and appropriate circuitry can place the data on bus 1202. Bus 1202 carries the data to main memory 1206, from which processor 1204 retrieves and executes the instructions. The instructions received by main memory 1206 may optionally be stored on storage device 1210 either before or after execution by processor 1204.

Computer system 1200 also includes a communication interface 1218 coupled to bus 1202. Communication interface 1218 provides a two-way data communication coupling to a network link 1220 that is connected to a local network 1222. For example, communication interface 1218 may be an integrated services digital network (ISDN) card, cable modem, satellite modem, or a modem to provide a data communication connection to a corresponding type of telephone line. As another example, communication interface 1218 may be a local area network (LAN) card to provide a data communication connection to a compatible LAN (or WAN component to communicate with a WAN). Wireless links may also be implemented. In any such implementation, communication interface 1218 sends and receives electrical, electromagnetic or optical signals that carry digital data streams representing various types of information.

Network link 1220 typically provides data communication through one or more networks to other data devices. For example, network link 1220 may provide a connection through local network 1222 to a host computer 1224 or to data equipment operated by an Internet Service Provider (ISP) 1226. ISP 1226 in turn provides data communication services through the world wide packet data communication network now commonly referred to as the "Internet" 1228.

Local network 1222 and Internet 1228 both use electrical, electromagnetic or optical signals that carry digital data streams. The signals through the various networks and the signals on network link 1220 and through communication interface 1218, which carry the digital data to and from computer system 1200, are example forms of transmission media.

Computer system 1200 can send messages and receive data, including program code, through the network(s), network link 1220 and communication interface 1218. In the Internet example, a server 1230 might transmit a requested code for an application program through Internet 1228, ISP 1226, local network 1222 and communication interface 1218.

The received code may be executed by processor 1204 as it is received, and/or stored in storage device 1210, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A computer system comprising:
one or more computer processors configured to execute software code stored in a tangible storage device to cause the computer system to:
identify a set of resources based on one or more search criteria;
generate a user interface configured to display:
in a first portion of the user interface:
indications of resources of the set of resources;
in a second portion of the user interface:
individually selectable attributes associated with the resources, and
histogram bars for the attributes that indicate numbers of the resources of the set of resources having the respective attributes; and
in a third portion of the user interface:
a summary of documents that include a selected keyword and which are associated with one or more resources of the set of resources, wherein the summary of documents includes instances of the selected keyword in the documents, and wherein the summary of documents further includes contexts for the selected keyword in the documents;
in response to a first user input, received via the user interface, indicating a selection of a first attribute of the attributes for exclusion:
filter the resources of the set of resources to a first subset that does not include the first attribute;
update the user interface to display, in the first portion of the user interface, the first subset and to visually indicate, in the second portion of the user interface, exclusion of the first attribute;
update the histogram bars, in the second portion of the user interface, to reflect, for each of the respective attributes, both:
  a number of resources having the respective attribute in the first subset, and
  a number of resources having the respective attribute in the set of resources;
in response to determining that at least one of the attributes is not associated with any resources of the first subset, disallow both selection and exclusion, via the second portion of the user interface, of the at least one of the attributes, whereby a filtering to zero resources is prevented; and
in response to a second user input selecting one or more resources of the first subset, update the user interface to display, in the third portion of the user interface, a summary of documents that include the selected keyword and which are associated with the one or more resources of the first subset.

2. The computer system of claim 1, wherein the one or more computer processors are further configured to execute software code to cause the computer system to:
in response to a third user input, received via the user interface, indicating a selection of a second attribute of the attributes for inclusion:
  further filter the resources of the set of resources to a second subset that both includes the second attribute and does not include the first attribute; and
  update the user interface to display, in the first portion of the user interface the second subset.

3. The computer system of claim 2, wherein the one or more computer processors are further configured to execute software code to cause the computer system to:
further in response to the third user input:
  update the histogram bars, in the second portion of the user interface, to reflect, for each of the respective attributes, both:
    a number of resources having the respective attribute in the second subset, and
    a number of resources having the respective attribute in the set of resources.

4. The computer system of claim 3, wherein the one or more computer processors are further configured to execute software code to cause the computer system to:
receive the search criteria for identifying the resources of the set of resources; and
identify the set of resources by applying the search criteria to data items associated with resources and/or properties associated with the data items or resources, wherein the data items include at least one of: documents, events, or entities.

5. A computer-implemented method comprising:
by one or more computer processors configured to execute software code stored in a tangible storage device:
  identifying a set of resources based on one or more search criteria;
  generating a user interface configured to display:
    in a first portion of the user interface:
      indications of resources of the set of resources;
    in a second portion of the user interface:
      individually selectable attributes associated with the resources, and
      histogram bars for the attributes that indicate numbers of the resources of the set of resources having the respective attributes; and
    in a third portion of the user interface:
      a summary of documents that include a selected keyword and which are associated with one or more resources of the set of resources, wherein the summary of documents includes instances of the selected keyword in the documents, and wherein the summary of documents further includes contexts for the selected keyword in the documents;
  in response to a first user input, received via the user interface, indicating a selection of a first attribute of the attributes for exclusion:
    filtering the resources of the set of resources to a first subset that does not include the first attribute;
    updating the user interface to display, in the first portion of the user interface, the first subset and to visually indicate, in the second portion of the user interface, exclusion of the first attribute;
    updating the histogram bars, in the second portion of the user interface, to reflect, for each of the respective attributes, both:
      a number of resources having the respective attribute in the first subset, and
      a number of resources having the respective attribute in the set of resources;
  in response to determining that at least one of the attributes is not associated with any resources of the first subset, disallowing both selection and exclusion, via the second portion of the user interface, of the at least one of the attributes, whereby a filtering to zero resources is prevented; and
  in response to a second user input selecting one or more resources of the first subset, updating the user interface to display, in the third portion of the user interface, a summary of documents that include the selected keyword and which are associated with the one or more resources of the first subset.

6. The computer-implemented method of claim 5 further comprising:
by the one or more computer processors configured to execute software code stored in the tangible storage device:
  in response to a third user input, received via the user interface, indicating a selection of a second attribute of the attributes for inclusion:
    further filtering the resources of the set of resources to a second subset that both includes the second attribute and does not include the first attribute; and
    updating the user interface to display, in the first portion of the user interface the second subset.

7. The computer-implemented method of claim 6 further comprising:
by the one or more computer processors configured to execute software code stored in the tangible storage device:
  further in response to the third user input:
    updating the histogram bars, in the second portion of the user interface, to reflect, for each of the respective attributes, both:
      a number of resources having the respective attribute in the second subset, and
      a number of resources having the respective attribute in the set of resources.

8. The computer-implemented method of claim 7 further comprising:
- by the one or more computer processors configured to execute software code stored in the tangible storage device:
  - receiving the search criteria for identifying the resources of the set of resources; and
  - identifying the resources by applying the search criteria to data items associated with resources and/or properties associated with the data items or resources, wherein the data items include at least one of: documents, events, or entities.

9. The computer system of claim 1, wherein the number of resources having the respective attribute in the first subset and the number of resources having the respective attribute in the set of resources are both reflected in a same respective histogram bar for each respective attribute.

10. The computer-implemented method of claim 5, wherein the number of resources having the respective attribute in the first subset and the number of resources having the respective attribute in the set of resources are both reflected in a same respective histogram bar for each respective attribute.

* * * * *